(12) United States Patent
Govindassamy

(10) Patent No.: US 10,182,368 B1
(45) Date of Patent: Jan. 15, 2019

(54) METHOD AND APPARATUS FOR BIDIRECTIONAL APPLICATIONS

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 81 days.

(21) Appl. No.: 15/270,785

(22) Filed: Sep. 20, 2016

(51) Int. Cl.
| | |
|---|---|
| H04W 28/02 | (2009.01) |
| H04W 72/04 | (2009.01) |
| H04L 12/26 | (2006.01) |
| H04W 24/08 | (2009.01) |
| H04W 52/02 | (2009.01) |
| H04L 5/14 | (2006.01) |

(52) U.S. Cl.
CPC ... H04W 28/0268 (2013.01); H04W 72/0446 (2013.01); H04L 5/14 (2013.01); H04L 43/0852 (2013.01); H04W 24/08 (2013.01); H04W 52/0209 (2013.01)

(58) Field of Classification Search
None
See application file for complete search history.

(56) References Cited

U.S. PATENT DOCUMENTS

| | | | |
|---|---|---|---|
| 6,285,892 B1 | 9/2001 | Hulyalkar | |
| 6,980,533 B1 | 12/2005 | Abraham et al. | |
| 8,345,645 B2 | 1/2013 | Kuc | |
| 8,654,778 B2 | 2/2014 | Yamada et al. | |
| 9,001,720 B2 | 4/2015 | Wentink et al. | |
| 9,338,748 B2 | 5/2016 | Wang et al. | |
| 9,367,113 B2 | 6/2016 | Attar | |
| 9,646,607 B2 | 5/2017 | Nix et al. | |
| 2007/0230400 A1 | 10/2007 | Kuchibhotla et al. | |
| 2007/0260830 A1 | 11/2007 | Faibish et al. | |
| 2008/0102880 A1* | 5/2008 | Gholmieh | H04W 52/228 455/522 |
| 2009/0054006 A1* | 2/2009 | Cai | H04L 1/18 455/73 |
| 2010/0046543 A1 | 2/2010 | Parnaby | |
| 2010/0111523 A1 | 5/2010 | Hirth et al. | |
| 2010/0128645 A1 | 5/2010 | Lin et al. | |

(Continued)

*Primary Examiner* — Faruk Hamza
*Assistant Examiner* — Cassandra L Decker
(74) *Attorney, Agent, or Firm* — Lerner, David, Littenberg, Krumholz & Mentlik, LLP

(57) ABSTRACT

A method and apparatus are disclosed for bidirectional applications where the source application entity and/or the destination application entity may align the uplink data transfer instances and the downlink transfer instances so that they are close to each other or overlap with each other. This may enable both uplink data transfer and downlink data transfer to take place in a single active state of the client terminal. This may reduce the rate at which the client terminal has to turn on and turn off its transmitter, receiver and other modules which may in turn reduce the client terminal transitions from sleep state to active state and vice versa. This may reduce the amount of time the client terminal spends in the active state. This may significantly reduce the power consumption in client terminal, which may be a significant advantage for battery operated client terminals.

25 Claims, 21 Drawing Sheets

(56) References Cited

U.S. PATENT DOCUMENTS

| | | |
|---|---|---|
| 2010/0138549 A1 | 6/2010 | Goel et al. |
| 2013/0142049 A1 | 6/2013 | Jim et al. |
| 2015/0305056 A1* | 10/2015 | Vangala ............ H04W 72/1242 455/450 |
| 2016/0286599 A1* | 9/2016 | Weingertner ......... H04M 7/006 |
| 2017/0251519 A1* | 8/2017 | Ohlsson .............. H04W 76/048 |

* cited by examiner

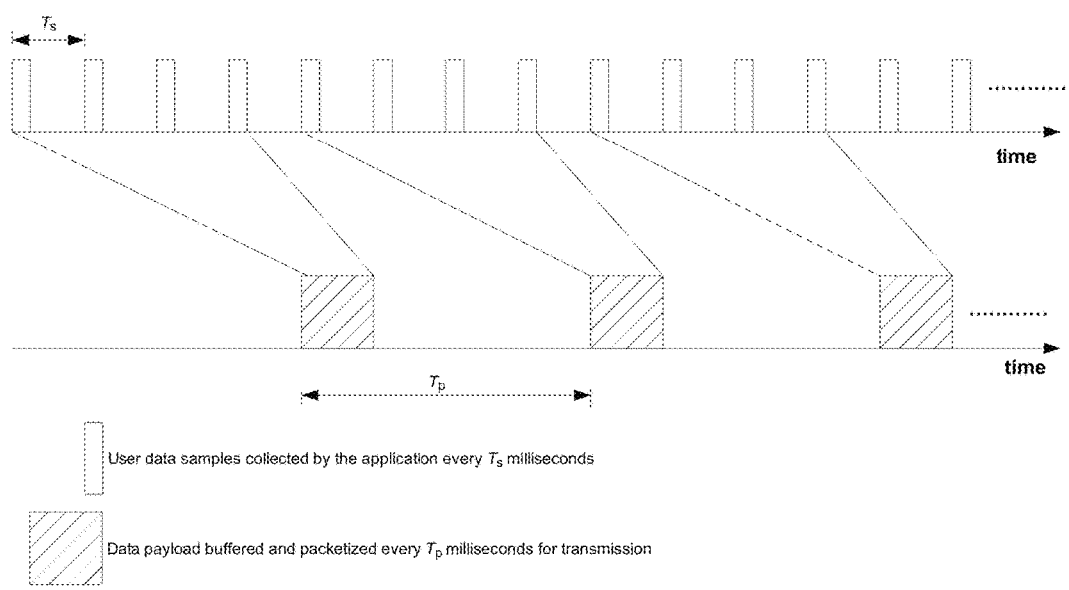

FIG. 9
Uplink Data Transfer and Downlink Data Transfer instances are aligned close to each other or overlap with each other.
| Downlink Data Transfer | Uplink Data Transfer |
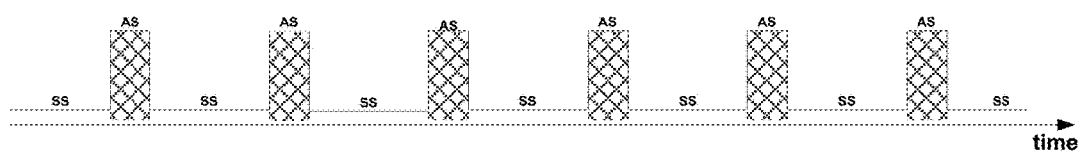
sleep state and active state of a client terminal to perform Uplink and Downlink Data Transfer instances at the same time in single active state
active state (AS)
sleep state (SS)

METHOD AND APPARATUS FOR BIDIRECTIONAL APPLICATIONS

CROSS REFERENCE TO RELATED APPLICATIONS

This application is related to U.S. patent application Ser. No. 15/264,788, filed Sep. 14, 2016, the disclosure of which is hereby incorporated herein by reference.

BACKGROUND

Typically a communication system comprises a network entity which provides services and terminals which use the services. In some communication systems, the server may be part of the network and in some communication systems, the server may be a separate entity. The network entity and the server are collectively referred herein as server and the terminals are referred herein as clients or client terminals. In the present disclosure, the terms clients and client terminals are used interchangeably and the terms server, network and network entity are used interchangeably. The communication path between a server and the client is referred herein as a "connection." Typically in a communication system the communication path from the server to the client terminal is herein referred to as a downlink (DL) or downlink channel, and the communication path from the client terminal to the server is herein referred to as an uplink (UL) or uplink channel. The data transmitted by the server to the client terminal on the downlink channel is herein referred to as downlink data transfer and the data transmitted by the client terminal to the server on the uplink channel is herein referred to as uplink data transfer.

Some communication systems are wire-line and some others are wireless. Communication systems based on Digital Subscriber Line (DSL), Cable Modem, fiber optics are examples of wire-line communication systems. Communication systems based on IEEE 802.16e standard, IEEE 802.11 standard, $3^{rd}$ Generation Partnership Project (3GPP) Wideband Code Division Multiple Access (WCDMA) standard, or Long Term Evolution (LTE) standard are examples of wireless communication systems. In wireless communication systems, a client terminal may also be referred as mobile station (MS).

Normally applications may use the connection established by the communication system between the server and the client to transfer user payload data. For example, internet browsing and Voice over Internet Protocol (VoIP) are some of the applications which may use a communication system to communicate between the server and the client.

Typically some applications may involve bidirectional data transfer. In such applications the bidirectional data transfer may be between a client terminal and a server as shown in FIG. 1, or the bidirectional data transfer may be between two client terminals as shown in FIG. 2A and in FIG. 2B. In some communication systems, an instance of the application may be running in the server and it may coordinate with the instances of the application running in one or more client terminals as shown in FIG. 2A for the transfer of user payload data between the client terminals. In some communication systems, the server may act as a communication path between client terminals and the instances of the application may run only in the client terminals as shown in FIG. 2B.

Normally, the air interface between the network and the client terminal may be organized in terms of frames and it normally spans a predefined duration. The frame duration may be different for different communication systems and it may be normally on the order of few milliseconds. For example, the frame duration may be 5 milliseconds.

Typically, in wireless communication systems the client terminals are mostly handheld portable battery operated devices. Hence it is important for the client terminals to operate in a power efficient manner. To reduce power consumption, the client terminal may turn off some or most of its hardware and software components when there is no data transfer expected in uplink, or in downlink, or in both uplink and downlink. The state in which the client terminal turns off most of its hardware and software components is referred to herein as "sleep state" (SS). The state in which the client terminal is involved in uplink data transfer or downlink data transfer or both uplink data transfer and downlink data transfer is referred to herein as "active state" (AS). To reduce power consumption in the client terminal, it is desirable to operate the client terminal in the sleep state as much as possible while performing data transfer required by the application.

The transition from sleep state to active state of the client terminal is referred to herein as "wake-up" state. The transition from active state to sleep state of the client terminal is referred to herein as "entering-sleep" state. The client terminal may transition from sleep state to active state for either uplink data transfer or downlink data transfer or both uplink data transfer and downlink data transfer. Some hardware and software components may be specific to uplink or downlink and they may be independently turned on or turned off based on uplink or downlink data transfer. Some hardware and software components in the client terminal may be common for both uplink data transfer and downlink data transfer and may have to be turned on for either uplink data transfer or downlink data transfer.

The wake-up state and the entering-sleep state may have the overhead in power consumption. Normally the power consumption may be higher during both the wake-up state and the entering-sleep state when compared to that of the sleep state but may be lower when compared to that of the active state. Typically the transition time for the wake-up state is longer than the transition time for the entering-sleep state. Also in general the power consumption during the wake-up state may be higher than that of during the entering-sleep state. An example of sleep state to wake-up state then to active state then to entering-sleep state and then back to sleep state transitions in a battery operated client terminal is illustrated in FIG. 3. As and when appropriate, the client terminal may enter into sleep state and active state and an example is illustrated in FIG. 4. For the rest of the discussion, the wake-up state and the entering-sleep state may not be explicitly discussed or shown in the drawings but they are always present.

Typically in most applications, the uplink data transfer and/or the downlink data transfer may not be continuous. For example in voice applications, the user's voice may be digitized, buffered, processed and then transferred as user payload data. Normally the user payload data may be transferred in bursts and in some cases they may be transferred in periodic intervals. FIG. 5 illustrates an example where the user data is sampled at every $T_s$ milliseconds and the sampled user data may be buffered and packetized as user payload data every $T_p$ milliseconds for transmission. This process is herein referred as "payload processing."

Normally in some applications, the client terminal may send the uplink data and may receive the downlink data at periodic intervals and may be at different instances as shown in FIG. 6A and FIG. 6B. In some applications the time interval between two consecutive uplink data transfer and the time interval between two consecutive downlink data transfer may be the same and an example of such application may be VoIP. To support such applications, the client terminal may enter into active state for the uplink data transfer and for the downlink data transfer separately as shown in FIG. 6C. This may lead to increased power consumption at the client terminal and this may be a significant disadvantage for a battery operated client terminal. In some applications the time interval between two consecutive uplink data transfer and the time interval between two consecutive downlink data transfer may be different and an example of such application may be internet browsing.

In some applications the client terminal may send the uplink data in non-periodic intervals and may receive the downlink data in non-periodic intervals. The uplink data transmission and downlink data reception may be at different time instances as shown in FIG. 7A and FIG. 7B. To support such applications, the client terminal may enter into active state for the uplink data transfer and for the downlink data transfer separately as shown in FIG. 7C. This may lead to increased power consumption at the client terminal and this may be a significant disadvantage for a battery operated client terminal.

Typically for a bidirectional data transfer applications, the same type of applications or different types of applications may be running in two different entities. For example, one instance of an application may be running in a client terminal and another instance of an application may be running in a server or in another client terminal. The application entity which sends the payload data is referred herein as "source application entity" and the application entity which receives the payload data is herein referred as "destination application entity."

The peer to peer communication between two application instances running in the source application entity and the destination application entity may be viewed as a virtual connection and the connection is herein referred to as "logical connection" as illustrated in FIG. 2A and FIG. 2B. Typically the source application entity and the destination application entity may exchange some of the connection information and/or the Quality of Service (QoS) information when they establish the application connection. Normally the applications running in source application entity and destination application entity may exchange additional information along with the user payload data for better quality of service. The additional information exchanged between two application entities may include but not be limited to source application entity identifier, destination application entity identifier, user payload data length, user payload data packet number, payload data time stamp, etc. The information that may be exchanged in addition to the user payload data is herein referred to as "control information." Some applications may send the control information along with the user payload data as a predefined header as shown in FIG. 8. Such header is herein referred as "payload header." For example, in Real time Transport Protocol (RTP), a commonly used protocol in bidirectional real time applications, some payload header information includes source application entity identifier and payload data time stamp. Some applications may send the control information as a separate control payload data and such control payload data is herein referred to as a "control message." The user payload data time stamp in the control information (inside a payload header or inside a control message) indicates the time at which the source application entity sends the user payload data to the destination application entity. The payload data time stamp sent by the source application entity in the payload data may help the destination application entity to know the time at which the payload data was sent by the source application entity.

In wireless communication systems, applications using conventional methods for bidirectional data transfer may exchange the data at different instances and may provide acceptable level of performance but at higher power consumption.

SUMMARY

A method and apparatus are disclosed wherein the source application entity and the destination application entity may align the uplink data transfer and downlink data transfer instances close to each other or overlap with each other such that it may reduce the amount of time and the rate at which a client terminal enters active state and be in the active state for the uplink data transfer and/or the downlink data transfer. The disclosed method may significantly reduce the power consumption in client terminals, which may be a significant advantage for battery operated client terminals.

In accordance with an aspect of the present disclosure, a method for bidirectional data transfer between a source application entity and a destination application entity in a wireless communication system may include controlling, by at least one processing device of at least one of the source application entity, the destination application entity or another application entity in the system, monitoring uplink data transfer and downlink data transfer between the source application entity and the destination application entity; and uplink data transfer instances and downlink data transfer instances to take place respectively in single active states of a client device of the system, based on the monitoring, wherein the client device is the source application entity or the destination application entity.

In one alternative, the method may include controlling, by the at least one processing device, when the source application entity and the destination application entity establish a connection at a level of an application, determining Quality of Service (QoS) requirements for the application; and negotiating a time interval for at least one of the uplink data transfer or the downlink data transfer such that the uplink data transfer instances and the downlink data transfer instances are aligned close to or overlapping with each other.

In one alternative, the least one processing device may be of the destination application entity as the client device and use a client device application to monitor the uplink data transfer timing and the downlink data transfer timing for n uplink data transfers $tul_x$, $tul_{x+1}$, $tul_{x+2}$, ..., $tul_{x+n-1}$ and n downlink data transfers $tdl_y$, $tdl_{y+1}$, $tdl_{y+2}$, ..., $tdl_{y+n-10}$; in which the downlink data transfer instances correspond respectively to times at which the client device is to receive downlink data from the source application entity; and the method may include: controlling, by the at least one processing device using the client device application, determining a time difference, $T_{zc}$, between every downlink data transfer instance and uplink data transfer instance pair of the n uplink and downlink data transfer instances, wherein $T_{zc}=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_{zc}$, from the time differences $T_{zc}$, $T_{zc+1}$, $T_{zc+2}$, ..., $T_{zc+n-1}$; and when a bidirectional application with periodic downlink data transfer and periodic uplink data transfer is determined, determining that the individual time differences $T_{zc}$, $T_{zc+1}$, $T_{zc+2}$, ..., $T_{zc+n-1}$ are approximately the same as the mean time difference $T'_{zc}$, when the individual time differences are within a predetermined threshold C of the mean time difference $T'_{zc}$, determining a difference, $T''_{zc}$, between a time duration between two consecutive uplink data transfer instances and two consecutive downlink data transfer instances, T1, and $T'_{zc}$, where $T''_{zc}=|T1-T'_{zc}|$, and when $T'_{zc} < T''_{zc}$, delaying an uplink data transfer instance at $tul_{y+n}$ to an uplink data transfer instance at $tul'_{y+n}$, wherein $tul'_{y+n} = (tul_{y+n}+T'_{zc})$, and when $T'_{zc} \geq T''_{zc}$, and the uplink data transfer instance at $tul_{y+n}$ is determined to be advanceable to an uplink data transfer instance at $tul''_{y+n}$, wherein $tul''_{y+n} = (tul_{y+n}-T''_{zc})$, advancing the uplink data transfer instance at $tul_{y+n}$ to the uplink data transfer instance at $tul''_{y+n}$.

In one alternative, whether the uplink data transfer instance at $tul_{y+n}$ is determined to be delayable to the uplink data transfer instance at $tul'_{y+n}$ may be based on a Quality of Service (QoS) parameter of at least one of delay, jitter or latency.

In one alternative, whether the uplink data transfer instance at $tul_{y+n}$ is determined to be advanceable to the uplink data transfer instance at $tul''_{y+n}$ may be based on a Quality of Service (QoS) parameter of at least one of delay, jitter or latency.

In one alternative, n may be determined based on at least one of simulation or field data analysis.

In one alternative, n may be equal to five.

In one alternative, when a determination is a payload header or a control message in control information from the source application entity contains a payload data time stamp, the payload data time stamp may be used to determine the time difference, $T_{zs}$.

In one alternative, the least one processing device may be of the source application entity as the client device and use a client device application to monitor the uplink data transfer timing and the downlink data transfer timing for n uplink data transfers $tul_x$, $tul_{x+1}$, $tul_{x+2}$, ..., $tul_{x+n-1}$ and n downlink data transfers $tdl_y$, $tdl_{y+1}$, $tdl_{y+2}$, ..., $tdl_{y+n-1}$; and the method may include controlling, by the at least one processing device, determining a time difference, $T_{zc}$, between every downlink data transfer instance and uplink data transfer instance pair of the n uplink and downlink data transfer instances, wherein $T_{zc}=|tdl_y-tul_x|$, $tdl_y$ is a given downlink data transfer instance of the n downlink data transfer instances and $tul_x$ is a given uplink data transfer instance of the n uplink data transfer instances; determining a mean time difference, $T'_{zc}$, from the time differences Tzc, Tzc+1, Tzc+2, ..., Tzc+n-1; when a bidirectional application with periodic downlink data transfer and periodic uplink data transfer is determined, determining a difference, $T''_{zc}$, between a time duration between two consecutive uplink data transfer instances and two consecutive downlink data transfer instances, T1, and $T'_{zc}$, where $T''_{zc}=|T1-T'_{zc}|$; transmitting at least one of the $T'_{zc}$ or the $T''_{zc}$ to the destination application entity; and negotiating, between the client device application and the destination application entity, timing alignment for the uplink data transfer instances and the downlink data transfer instances to be brought close to or overlap with each other, in which the client terminal application and the destination application entity exchange and negotiate timing information through at least one of a payload header or control message in control information.

In one alternative, the uplink data transfer instances may be delayed by the client device application by $TAU'_{zc}$ and the downlink data transfer instances are advanced by the destination application entity by $TAD'_{zc}$, where $TAU'_{zc}+TAD'_{zc}=T'_{zc}$, and wherein the destination application entity may be a given client or a given server.

In one alternative, the method may further include controlling, by the at least one processing device, when at least one of (i) at least one of the downlink data transfer or the uplink data transfer is determined to be non-periodic or (ii) an uplink data transfer period is determined to be different from a downlink data transfer period, periodically determining, based on the monitoring, whether to continue a process to align the uplink data transfer with the downlink data transfer.

In one alternative, the determining whether to continue the process to align the uplink data transfer with the downlink data transfer may be at least one of (i) based on Quality of Service (QoS) criteria including at least one of latency and jitter or (ii) performed after hysteresis is applied to at least one metric used in determining whether to continue the process to align.

In one alternative, the least one processing device may be of the another application entity as a server and use a server application to monitor the uplink data transfer timing and the downlink data transfer timing for n uplink data transfers $tul_x$, $tul_{x+1}$, $tul_{x+2}$, ..., $tul_{x+n-1}$ and n downlink data transfers $tdl_y$, $tdl_{y+1}$, $tdl_{y+2}$, ..., $tdl_{y+n-1}$; in which the uplink data transfer instances correspond respectively to times at which the server is to receive uplink data from the source application entity; and the method may further include: controlling, by the at least one processing device using the server application, determining a time difference, $T_{zs}$, between every downlink data transfer and uplink data transfer instance pair of the n uplink and downlink data transfer instances, wherein $T_{zs}=|tdl_y-tul_x|$, $tdl_y$ is a given downlink data transfer instance of the n downlink data transfer instances and $tul_x$ is a given uplink data transfer instance of the n uplink data transfer instances; determining a mean time difference, $T'_{zs}$, from the time differences $T_{zs}$, $T_{zs+1}$, $T_{zs+2}$, ..., $T_{zs+n-1}$; and when a bidirectional application with a periodic downlink data transfer and uplink data transfer is determined, determining that the individual time differences $T_{zs}$, $T_{zs+1}$, $T_{zs+2}$, ..., $T_{zs+n-1}$ are approximately the same as the mean time difference $T'_{zs}$, when the individual time differences are within a predetermined threshold C of the mean time difference $T'_{zs}$, determining a difference, $T''_{zs}$, between a time duration between two consecutive uplink data transfer instances and two consecutive downlink data transfer instances, T1, and $T'_{zs}$, where $T''_{zs}=|T1-T'_{zs}|$, and when $T'_{zs} < T''_{zs}$, delaying a downlink data transfer instance at $tdl_{y+n}$ to a downlink data transfer instance at $tdl'_{y+n}$, wherein $tdl'_{y+n}=(tdl_{y+n}+T'_{zs})$, and when $T'_{zs} \geq T''_{zs}$ and the downlink data transfer instance at $tdl_{y+n}$ is determined to be advanceable to a downlink data transfer instance at $tdl''_{y+n}$ wherein $tdl''_{y+n}=(tdl_{y+n}-T'_z)$, advancing the downlink data transfer instance at $tdl_{y+n}$ to the downlink data transfer instance at $tdl''_{y+n}$.

In one alternative, whether the downlink data transfer instance at $tdl_{y+n}$ is determined to be delayable to the downlink data transfer instance at $tdl'_{y+n}$ may be based on a Quality of Service (QoS) parameter of at least one of delay, jitter or latency.

In one alternative, whether the downlink data transfer instance at $tdl_{y+n}$ is determined to be advanceable to the downlink data transfer instance at $tdl''_{y+n}$ may be based on a Quality of Service (QoS) parameter of at least one of delay, jitter or latency.

In one alternative, when a determination is a payload header or a control message in control information from the source application entity contains payload data time stamp, the payload data time stamp from the source application entity may be used to determine the time difference, $T_{zs}$.

In one alternative, the least one processing device may be of the another application entity as a server and use an application to monitor the uplink data transfer timing and the downlink data transfer timing for n uplink data transfers $tul_x$, $tul_{x+1}$, $tul_{x+2}$, ..., $tul_{x+n-1}$ and n downlink data transfers $tdl_y$, $tdl_{y+1}$, $tdl_{y+2}$, ..., $tdl_{y+n-1}$, and the method may further include controlling, by the at least one processing device, using the application, determining a time difference, $T_{zs}$, between every downlink data transfer and uplink data transfer instance pair of the n uplink and downlink data transfer instances, wherein $T_{zs}=|tdl_y-tul_x|$, $tdl_y$ is a given downlink data transfer instance of the n downlink data transfer instances and $tul_x$ is a given uplink data transfer instance of the n uplink data transfer instances; determining a mean time difference, $T'_{zs}$, from the time differences $T_{zs}$, $T_{zs+1}$, $T_{zs+2}$, ..., $T_{zs+n-1}$; when a bidirectional application with a periodic downlink data transfer and uplink data transfer is determined, determining a difference, $T''_{zs}$, between a time duration between two consecutive uplink data transfer instances and two consecutive downlink data transfer instances, T1, and $T'_{zs}$, where $T''_{zs}=|T1-T'_{zs}|$, and transmitting, by the server, at least one of the $T'_{zs}$ or the $T''_{zs}$ to the destination application entity; and negotiating, between the server and the destination application entity, timing alignment for the uplink data transfer instances and the downlink data transfer instances to be brought close to or overlap with each other, in which the server and the destination application entity exchange and negotiate the timing information through at least one of a payload header or a control message in control information.

In one alternative, the downlink data transfer instances may be delayed by the server by $TAD'_{zs}$ and the uplink data transfer instances may be advanced by the destination application entity by $TAU'_{zs}$, where $TAU'_{zs}+TAD'_{zs}=T'_{zs}$ such that the downlink data transfer instances and uplink data transfer instances are brought close to each other or overlap with each other, and wherein the destination application entity is one or more given clients, the application is being executing in two of the given clients and the server is coordinating the data transfer between the two given clients.

In accordance with an aspect of the present disclosure, an apparatus for bidirectional data transfer between a source application entity and a destination application entity in a wireless communication system may include circuitry of at least one of the source application entity, the destination application entity or another application entity in the system. The circuitry may be configured to control: monitoring uplink data transfer and downlink data transfer between the source application entity and the destination application entity; and uplink data transfer instances and downlink data transfer instances to take place respectively in single active states of a client device of the system, based on the monitoring, wherein the client device is the source application entity or the destination application entity.

In accordance with an aspect of the present disclosure, a wireless communication device may include a receiver to receive a wireless communication; and a processing device configured for bidirectional data transfer between a source application entity and a destination application entity in a wireless communication system, wherein the wireless communication device is one of the source application entity, the destination application entity and another application entity in the system. The processing device may be configured to control: monitoring uplink data transfer and downlink data transfer between the source application entity and the destination application entity; and uplink data transfer instances and downlink data transfer instances to take place respectively in single active states of a client device of the system, based on the monitoring, wherein the client device is the source application entity or the destination application entity.

BRIEF DESCRIPTION OF THE DRAWINGS

FIG. 5 illustrates the user data sampling and payload formatting and packetizing by the source device before sending the payload data to the destination device.

FIG. 9 illustrates the sleep state and active state of a client after the uplink data transfer instances and the downlink data transfer instances are brought close to each other or overlap with each other such that the client terminal performs the uplink data transfer and downlink data transfer in a single active state according to the aspect of the present disclosure.

DETAILED DESCRIPTION

Figure 1:
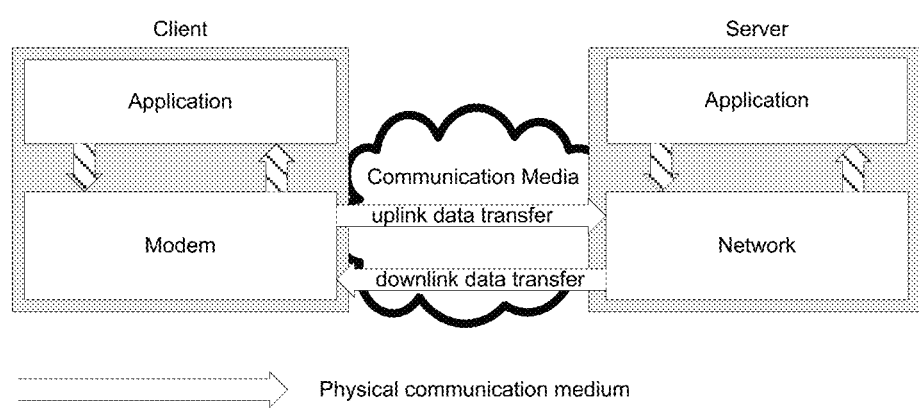
FIG. 1 illustrates the bidirectional data transfer application running in a client and in a server in a communication system.

The foregoing aspects, features and advantages of the present disclosure will be further appreciated when considered with reference to the following description of preferred embodiments and accompanying drawings, wherein like reference numerals represent like elements. In describing the preferred embodiments of the disclosure illustrated in the appended drawings, specific terminology will be used for the sake of clarity. However, the disclosure is not intended to be limited to the specific terms used.

According to the aspects of the present disclosure, the source application entity and/or the destination application entity may align the uplink data transfer instances and the downlink transfer instances close to each other or may overlap with each other, such that both uplink data transfer and downlink data transfer may take place in a single active state of the client terminal. This may result in the reduction in the client terminal transitions from sleep state to active state and may reduce the amount of time the client terminal spent in the active state. This may significantly reduce the power consumption in a client terminal, which may be a significant advantage for battery operated client terminals.

According to an aspect of the present disclosure when the source application entity and the destination application entity establish the application level connection, the source application entity and the destination application entity may consider the QoS requirements for the application and may negotiate the time interval for the uplink data transfer and/or the time interval for the downlink data transfer and may align the uplink data transfer instances and the downlink data transfer instances close to each other or may overlap with each other, such that both the uplink data transfer and the downlink data transfer may take place in a single active state of the client terminal as illustrated in FIG. 9.

According to an aspect of the present disclosure the client terminal application may monitor the uplink data transfer timing and the downlink data transfer timing for n uplink data transfers and n downlink data transfers. The uplink data transfer instances are represented as $tul_x$, $tul_{x+1}$, $tul_{x+2}$, ..., $tul_{x+n-1}$. The downlink data transfer instances are represented as $tdl_y$, $tdl_{y+1}$, $tdl_{y+2}$, ..., $tdl_{y+n-1}$. The downlink data transfer instances represented here are the time at which the client terminal may receive the downlink data from the source application entity. If the source application entity includes the payload data time stamp in the control information, then the client terminal may use that as the timing information for downlink data transfer instance.

According to another aspect of the present disclosure the client terminal application may calculate the time differences between each downlink data transfer instance and uplink data transfer instance pairs using EQ. (1):

$$T_{zc}=|tdl_y-tul_x| \quad \text{EQ. (1)}$$

The client terminal application may calculate $T_{zc}$, $T_{zc+1}$, $T_{zc+2}$, ..., and $T_{zc+n-1}$ using EQ. (1) for the time differences between n downlink data transfer and uplink data transfer instance pairs. The client terminal application may estimate the mean time difference $T'_{zc}$ from the calculated time differences $T_{zc}$, $T_{zc+1}$, $T_{zc+2}$, ..., $T_{zc+n-1}$. For an application where the downlink data transfer and the uplink data transfer is periodic, the client terminal application may determine that the individual time differences $T_{zc}$, $T_{zc+1}$, $T_{zc+2}$, ..., $T_{zc+n-1}$ may be approximately the same as that of the mean value $T'_{zc}$ if the individual time differences are within a configurable threshold C1 of the mean value.

For a bidirectional application with periodic downlink data transfer and periodic uplink data transfer, let T1 may be the time duration between two consecutive uplink data transfer instances and two consecutive downlink data transfer instances. According to another aspect of the present disclosure the client terminal application may calculate the difference between T1 and $T'_{zc}$ using EQ. (2):

$$T''_{zc}=|T1-T'_{zc}| \quad \text{EQ. (2)}$$

Figure 10:
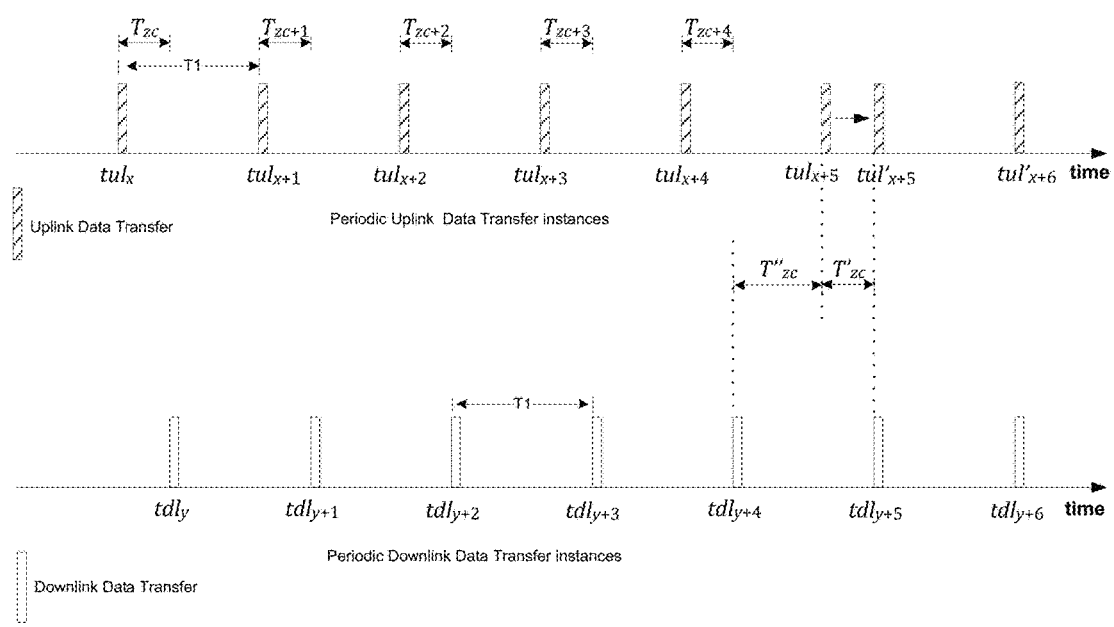
FIG. 10 illustrates the client terminal application delaying the uplink data transfer instances by $T'_{zc}$ in accordance with the aspects of the present disclosure to bring the uplink data transfer instances close to or overlap with the downlink data transfer instances.

According to another aspect of the present disclosure the client terminal application may compare $T'_{zc}$ and $T''_{zc}$ and if $T'_{zc}<T''_{zc}$ then the client terminal application may delay $tul_{y+n}$ to $tul'_{y+n}$ where $tul'_{y+n}=(tul'_{y+n}+T'_{zc})$ as illustrated in FIG. 10. The client terminal application may do payload processing to align the timings of the uplink data transfer instances close to the downlink data transfer instances or overlap with the downlink data transfer instances. Starting from the uplink data transfer instance $tul'_{y+n}$ the client terminal application may align all further uplink data transfer instances at time interval T1 relative to $tul'_{y+n}$ as shown in FIG. 10. This may result in the uplink data transfer instances and the downlink data transfer instances aligned close to or overlapped with each other starting from the uplink data transfer instance $tul'_{y+n}$. The client terminal application's decision to move the $tul_{y+n}$ to $tul'_{y+n}$ may depend on some of the QoS parameters such as delay, jitter, latency, etc. The number n may be configurable and it may be different for different type of applications. The value n may be determined by simulations and/or field data analysis. In the example shown in FIG. 10, n is chosen to be five. In case if the payload header or the control message contains the payload data time stamp, the client terminal application may use the payload data time stamp sent by the source application entity in the timing alignment calculation in EQ. (1) to delay the uplink data transfer instance close to or overlap with the downlink data transfer instance.

Figure 11:
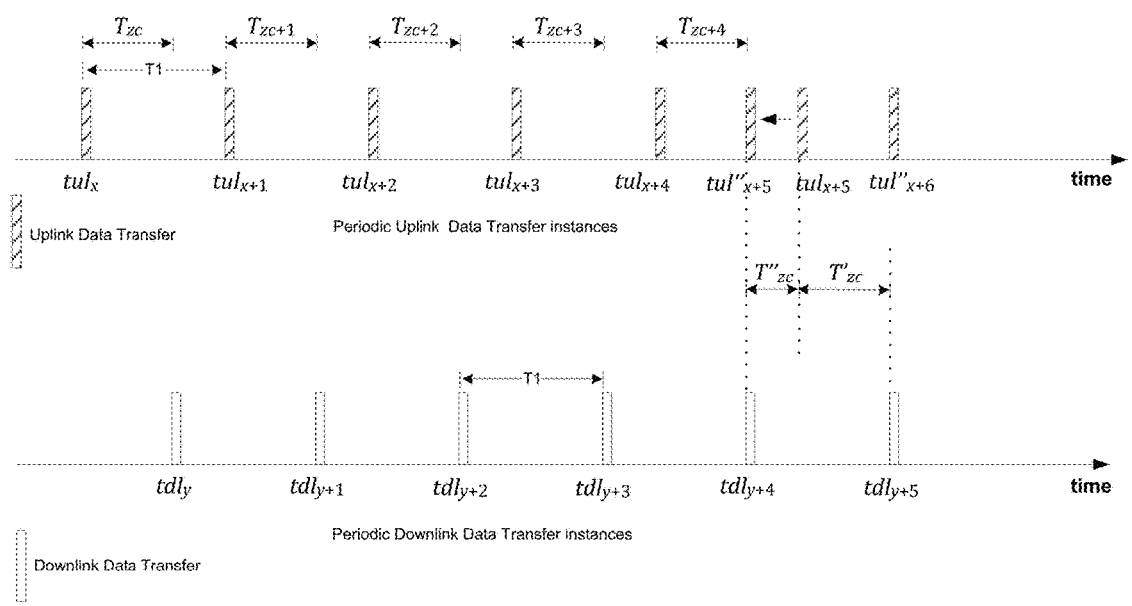
FIG. 11 illustrates the client terminal application advancing the uplink data transfer instances by $T''_{zc}$ in accordance with the aspects of the present disclosure to bring the uplink data transfer instances close to or overlap with the downlink data transfer instances.

According to another aspect of the present disclosure the client terminal application may compare $T'_{zc}$ and $T''_{zc}$, and if $T'_{zc} \geq T''_{zc}$ then the client terminal application may advance the uplink data transfer at $tul_{y+n}$ to $tul''_{y+n}$ where $tul''_{y+n} = (tul_{y+n} - T''_{zc})$ and this is illustrated in FIG. 11. The client terminal application may do payload processing to align the timings of the uplink data transfer instances close to the downlink data transfer instances or overlap with the downlink data transfer instances. Starting from the uplink data transfer instance $tul''_{y+n}$ the client terminal application may align all further uplink data transfer instances at time interval T1 relative to $tul''_{y+n}$ as shown in FIG. 11. This may result in the uplink data transfer instances and the downlink data transfer instances are aligned close to or overlapped with each other starting from the uplink data transfer instance $tul''_{y+n}$. The client terminal application's decision to move the $tul_{y+n}$ to $tul''_{y+n}$ may depend on some of the QoS parameters such as delay, jitter, latency, etc. The number n may be configurable and it may be different for different type of applications. The value n may be determined by simulations and/or field data analysis. In the example shown in FIG. 11, n is chosen to be five. In case if the payload header or the control message contains the payload data time stamp, the client terminal application may use the payload data time stamp sent by the source application entity in the timing alignment calculation in EQ. (1) to advance the uplink data transfer instance close to or overlap with the downlink data transfer instance.

According to yet another aspect of the present disclosure the server application may monitor the uplink data transfer instances and the downlink data transfer instances for n uplink data transfers and n downlink data transfers. The uplink data transfer instances herein are represented as $tul_x$, $tul_{x+1}$, $tul_{x+2}$, ..., $tul_{x+n-1}$. The downlink data transfer instances herein are represented as $tdl_y$, $tdl_{y+1}$, $tdl_{y+2}$, ..., $tdl_{y+n-1}$. The uplink data transfer instances represented here are the time at which the server may receive the uplink data from the source application entity. If the source application entity sends the payload data time stamp in the control information then the server may use that as the timing information for uplink data transfer instance.

According to yet another aspect of the current disclosure the server application may calculate the time differences between each downlink data transfer and uplink data transfer instance pairs using EQ. (3):

$$T_{zs} = |tdl_y - tul_x| \quad \text{EQ. (3)}$$

The server may calculate $T_{zs}$, $T_{zs+1}$, $T_{zs+2}$, ..., $T_{zs+n-1}$, using EQ. (3). The server application may estimate the mean time difference $T'_{zs}$ from the calculated time differences $T_{zs}$, $T_{zs+1}$, $T_{zs+2}$, ..., $T_{zs+n-1}$. For a bidirectional application where the downlink data transfer and the uplink data transfer are periodic, the server application may determine that the individual time differences $T_{zs}$, $T_{zs+1}$, $T_{zs+2}$, ..., $T_{zs+n-1}$ may approximately be the same as that of the mean value $T'_{zs}$ if the individual time differences are within a configurable threshold C1 of the mean value.

For a bidirectional application with periodic downlink data transfer and periodic uplink data transfer, let T1 may be the time duration between two consecutive uplink data transfer and two consecutive downlink data transfer. According to yet another aspect of the current disclosure the server application may calculate the difference between T1 and $T'_{zs}$ using the following equation:

$$T''_{zs} = |T1 - T'_{zs}| \quad \text{EQ. (4)}$$

Figure 12:
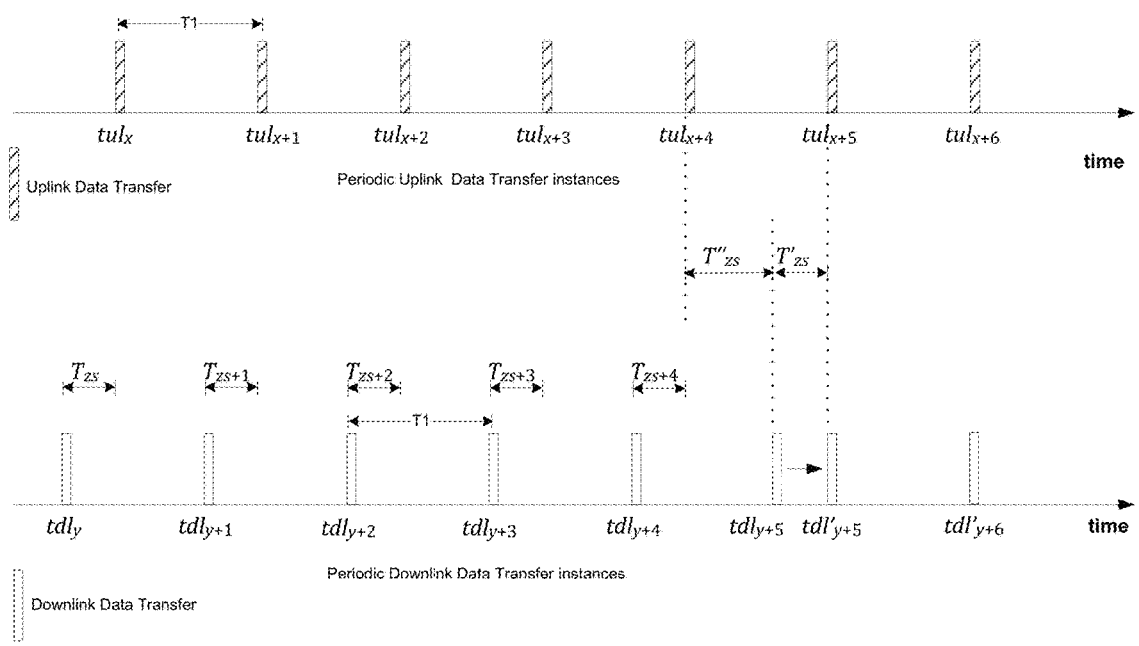
FIG. 12 illustrates the server application delaying the downlink data transfer instances by $T'_{zs}$ in accordance with the aspects of the present disclosure to bring the downlink data transfer instances close to or overlap with the uplink data transfer instances.

According to yet another aspect of the present disclosure the server application may compare $T'_{zs}$ and $T''_{zs}$, and if $T'_{zs} < T''_{zs}$ then the server application may delay $tdl_{y+n}$ to $tdl'_{y+n}$ where $tdl'_{y+n} = (tdl_{y+n} + T'_{zs})$ and this is illustrated in FIG. 12. The server application may do payload processing to align the timings of the downlink data transfer instances close to the uplink data transfer timings or overlap with the uplink data transfer timings. Starting from the downlink data transfer instance $tdl'_{y+n}$ the server application may align all further downlink data transfer instances at time interval T1 relative to $tdl'_{y+n}$ as shown in FIG. 12. This may result in the downlink data transfer and the uplink data transfer instances are aligned close to or overlapped with each other starting from the downlink data transfer instance $tdl'_{y+n}$. The server application's decision to move the $tdl_{y+n}$ to $tdl'_{y+n}$ may depend on some of the QoS parameters such as delay, jitter, latency, etc. The number n may be configurable and it may be different for different type of applications. The value n may be determined by simulations and/or field data analysis. In the example shown in FIG. 12, n is chosen to be five. In case if the payload header or the control message contains the payload data time stamp, the server may use the payload data time stamp sent by the source application entity in the timing alignment calculation in EQ. (3) to delay the downlink data transfer instance close to or overlap with the uplink data transfer instance.

Figure 13:
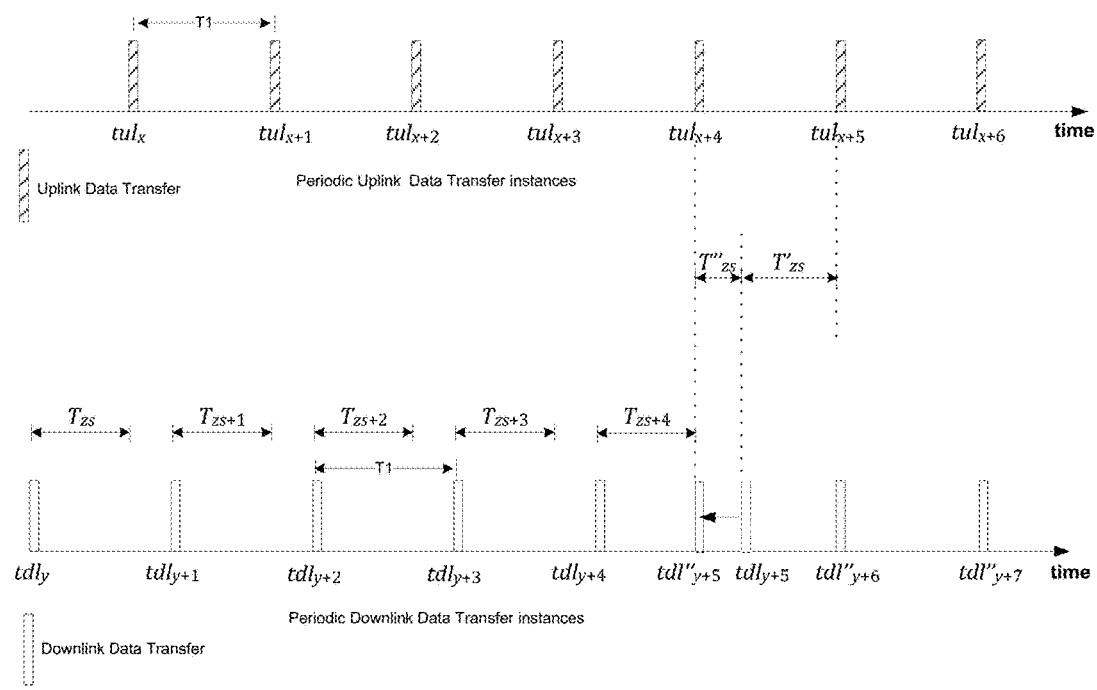
FIG. 13 illustrates the server application advancing the downlink data transfer instances by $T''_{zs}$ in accordance with the aspects of the present disclosure to bring the downlink data transfer instances close to or overlap with the uplink data transfer instances.

According to yet another aspect of the current disclosure the server application may compare $T'_{zs}$ and $T''_{zs}$, and if $T'_{zs} \geq T''_{zs}$ then the server application may advance the downlink data transfer at $tdl_{y+n}$ to $tdl''_{y+n}$ where $tdl''_{y+n} = tdl_{y+n} - T''_{zs}$ and this is illustrated in FIG. 13. The server application may do payload processing to align the timings of the downlink data transfer instances close to the uplink data transfer timings or overlap with the uplink data transfer timings. Starting from the downlink data transfer instance $tdl''_{y+n}$ the server application may align all further downlink data transfer instances at time interval T1 relative to $tdl''_{y+n}$ as shown in FIG. 13. This may result in the downlink data transfer and the uplink data transfer instances are aligned close to or overlapped with each other starting from the downlink data transfer instance $tdl''_{y+n}$. The server application's decision to move the $tdl_{y+n}$ to $tdl''_{y+n}$ may depend on some of the QoS parameters such as delay, jitter, latency, etc. The number n may be configurable and it may be different for different type of applications. The value n may be determined by simulations and/or field data analysis. In the example shown in FIG. 13, n is chosen to be five. In case if the payload header or the control message contains the payload data time stamp, the server application may use the payload data time stamp sent by the source application entity in the timing alignment calculation in EQ. (3) to advance the downlink data transfer instance close to or overlap with the uplink data transfer instance.

Figure 2A:
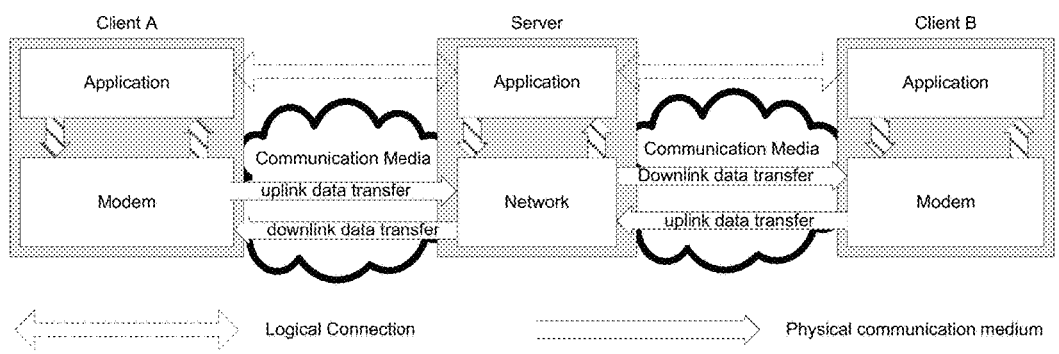
FIG. 2A illustrates bidirectional data transfer application running in two client terminals and the data transfer between the client terminals is coordinated by the application in the server.
Figure 2B:
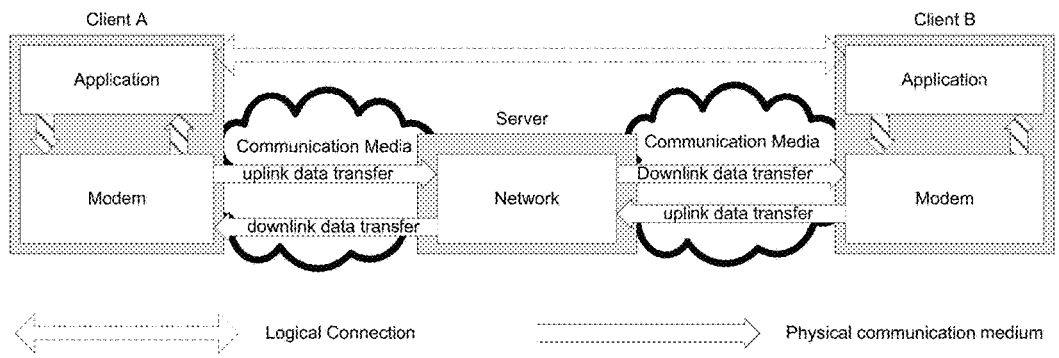
FIG. 2B illustrates bidirectional data transfer application running in two client terminals and the server acting as a communication path between the two client terminals.
Figure 3:
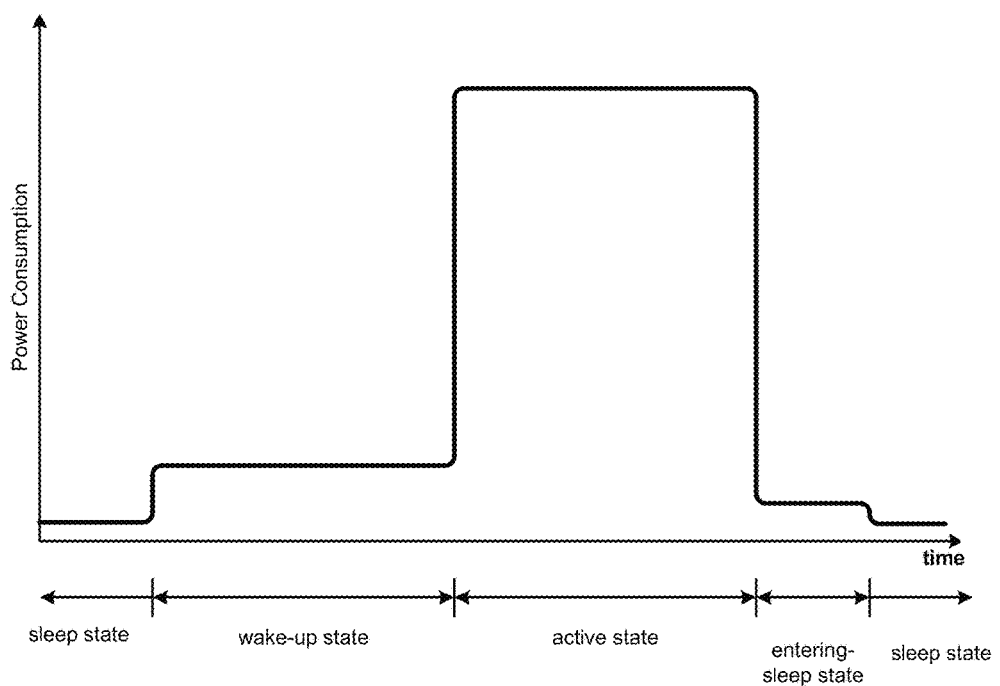
FIG. 3 illustrates sleep state, wake-up state, active state and entering-sleep state in a client terminal.
Figure 4:
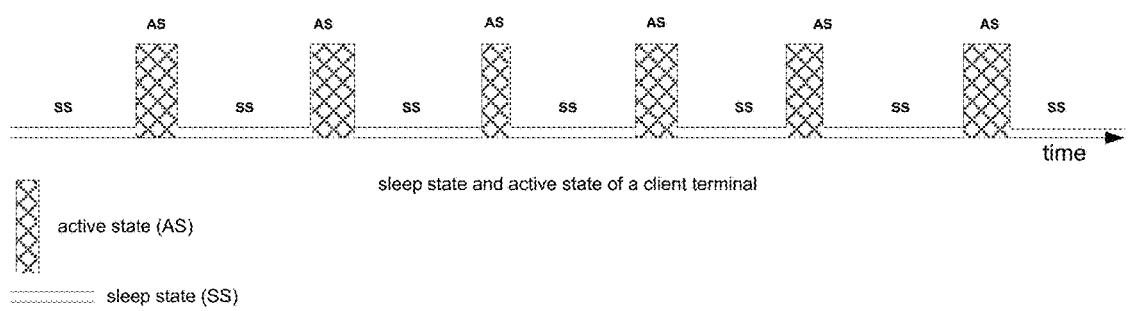
FIG. 4 illustrates a client terminal entering and exiting sleep state and active state.
Figure 6A:
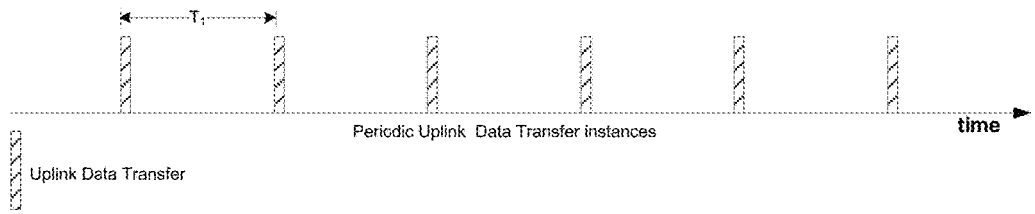
FIG. 6A illustrates periodic uplink data transfer instances for a bidirectional data transfer application.
Figure 6B:
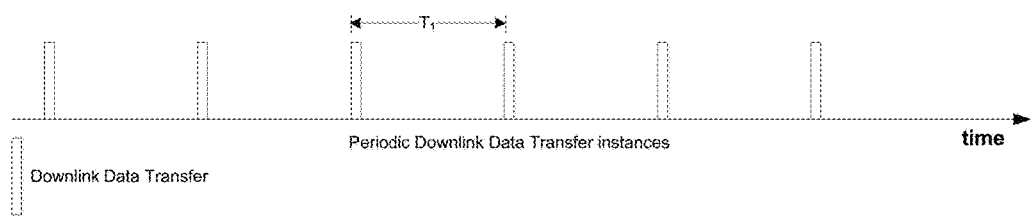
FIG. 6B illustrates periodic downlink data transfer instances for a bidirectional data transfer application.
Figure 6C:
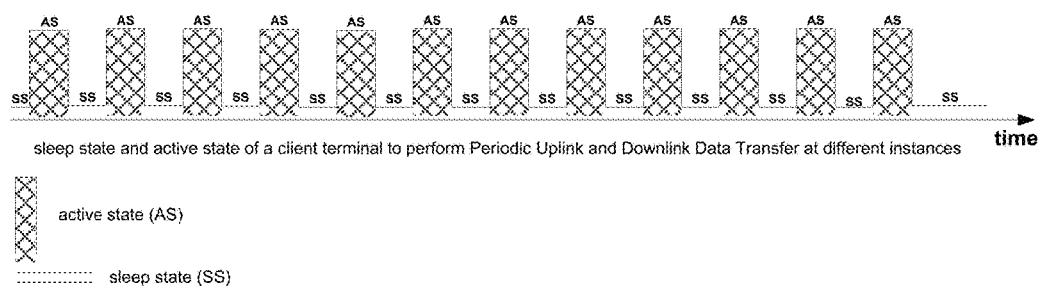
FIG. 6C illustrates the client terminal entering into sleep state and active state for periodic uplink data transfer and periodic downlink data transfer to support a bidirectional data transfer application.
Figure 7A:
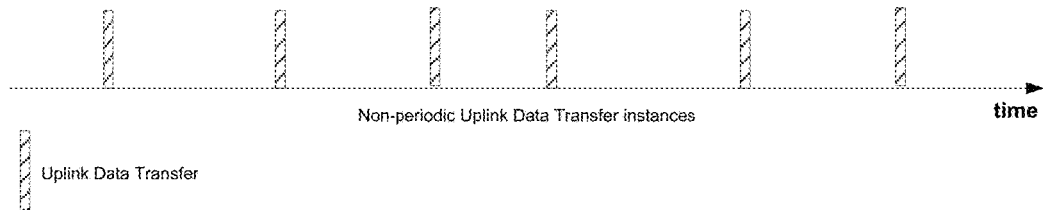
FIG. 7A illustrates non-periodic uplink data transfer instances for a bidirectional data transfer application.
Figure 7B:
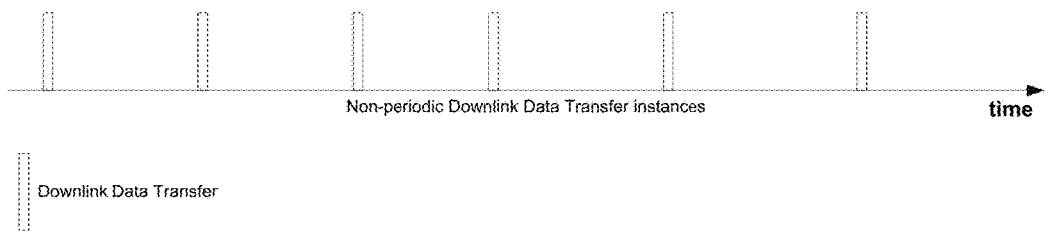
FIG. 7B illustrates the non-periodic downlink data transfer instances for a bidirectional data transfer application.
Figure 7C:
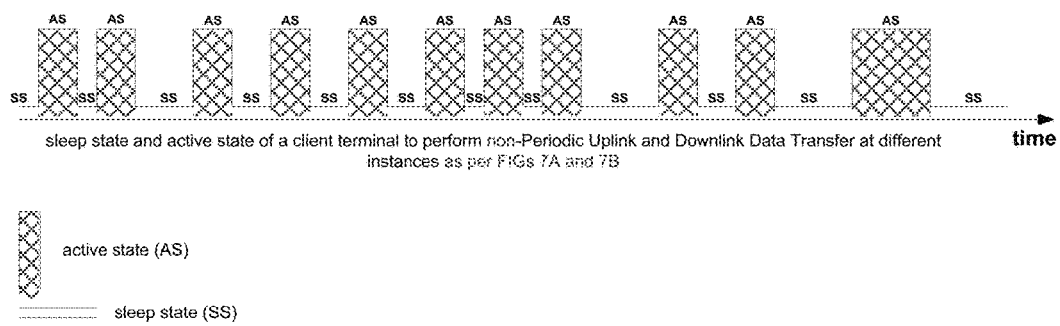
FIG. 7C illustrates the client terminal entering into sleep state and active state for non-periodic uplink data transfer and non-periodic downlink data transfer to support a bidirectional data transfer application.
Figure 8:
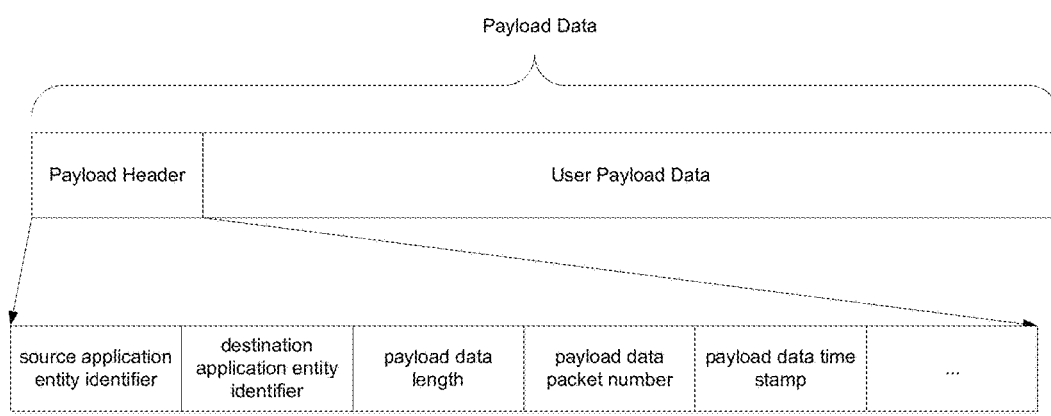
FIG. 8 illustrates the payload format for a bidirectional data transfer application where the header in the payload carries the control information.
Figure 14:
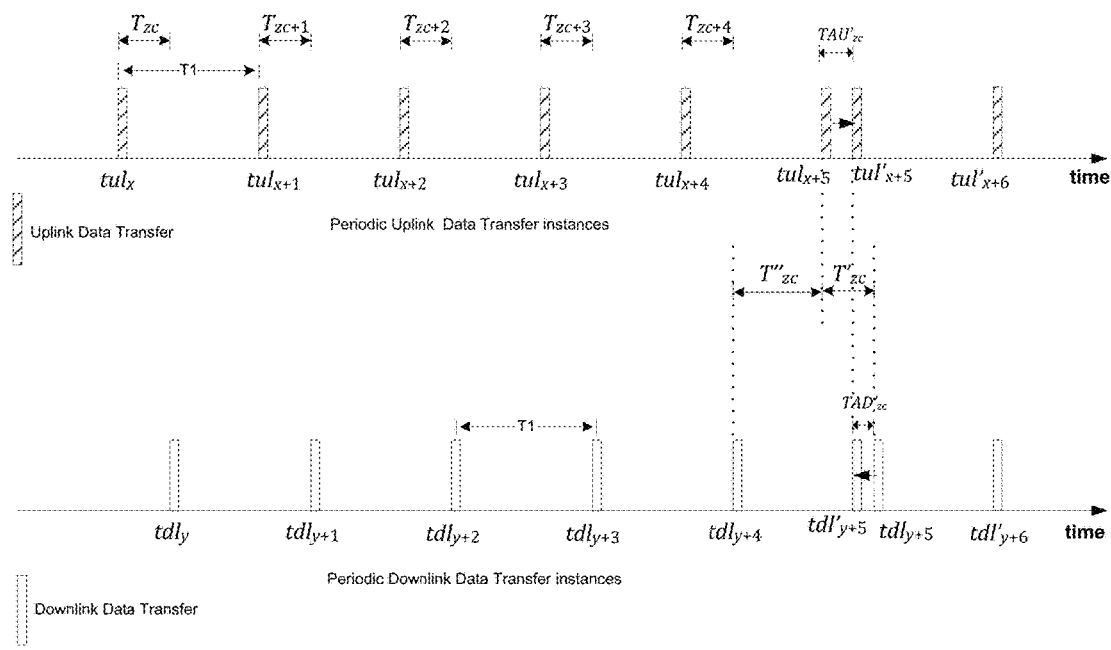
FIG. 14 illustrates the client application delaying the uplink data transfer instances by $TAU'_{zc}$ and the destination application advancing the downlink data transfer instances by $TAD'_{zc}$ in accordance with the aspects of the present disclosure to bring uplink data transfer instances close to or overlap with the downlink data transfer instances.
Figure 15:
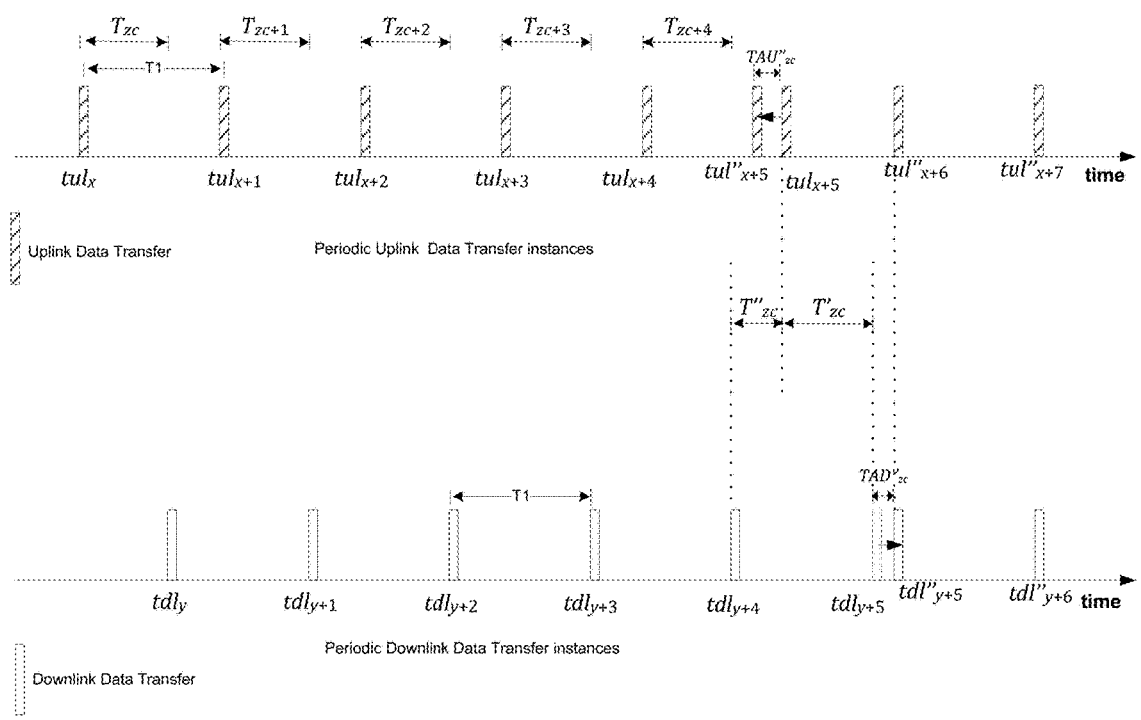
FIG. 15 illustrates the client application advancing the uplink data transfer instances by $TAU''_{zc}$ and the destination application delaying the downlink data transfer instances by $TAD''_{zc}$ in accordance with the aspects of the present disclosure to bring the uplink data transfer instances close to or overlap with the downlink data transfer instances.

According to yet another aspect of the current disclosure, for the scenario illustrated in FIG. 2B, the client terminal application may send the $T'_{zc}$ calculated using EQ. (1) and/or may send the $T''_{zc}$ calculated using EQ. (2) to the destination application entity. The client terminal application and the destination application entity may negotiate and may agree on the timing alignment for the uplink data transfer instances and the downlink data transfer instances such that they both may be brought close to each other or may overlap with each other. The client terminal application and the destination application entity may exchange and negotiate the timing information either through the payload header or through the control messages. An example where the client terminal application may delay the uplink data transfer instances by $TAU'_{zc}$ and the destination application entity may advance the downlink data transfer instances by $TAD'_{zc}$, where $TAU'_{zc}+TAD'_{zc}=T'_{zc}$ such that the uplink data transfer instances and downlink data transfer instances may be brought close to each other or may overlap with each other is shown in FIG. 14. An example where the client terminal application may advance the uplink data transfer instances by $TAU''_{zc}$ and the destination application entity may delay the downlink data transfer instances by $TAD''_{zc}$, where $TAU''_{zc}+TAD''_{zc}=T''_{zc}$ such that the uplink data transfer instances and downlink data transfer instances may be brought close to each other or may overlap with each other is shown in FIG. 15. Here the destination application entity may be a client or a server.

Figure 16:
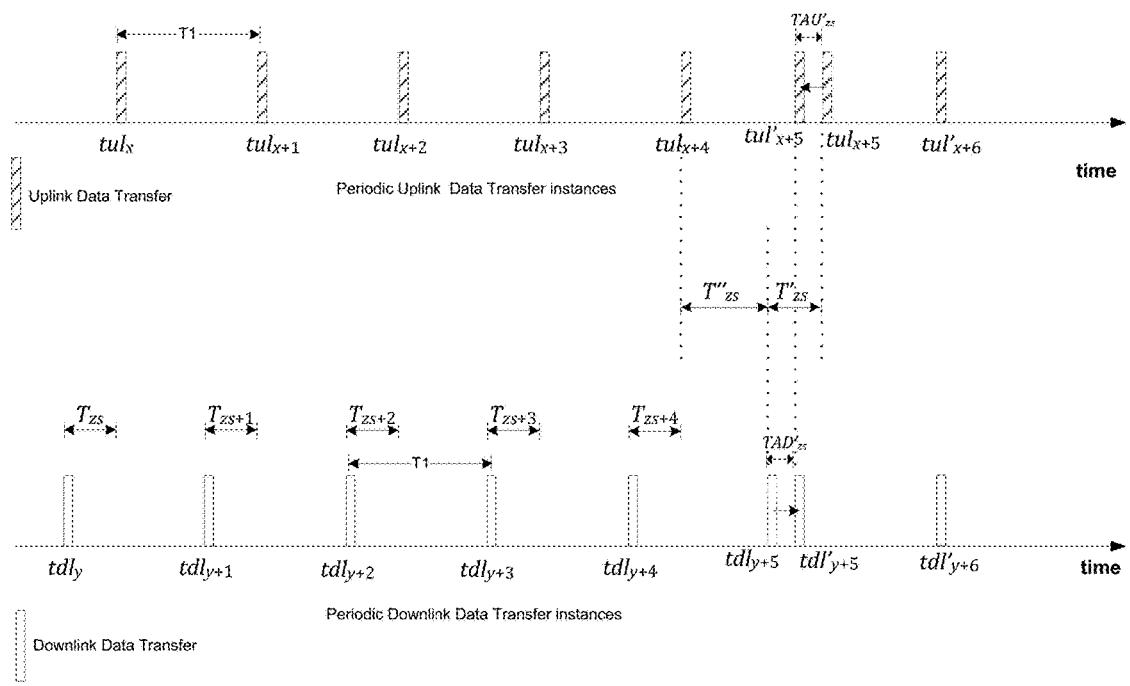
FIG. 16 illustrates the server delaying the downlink data transfer instances by $TAD'_{zs}$ and the source or destination or both applications advancing the uplink data transfer instances by $TAU'_{zs}$ in accordance with the aspects of the present disclosure to bring the downlink data transfer instances close to or overlap with the uplink data transfer instances.
Figure 17:
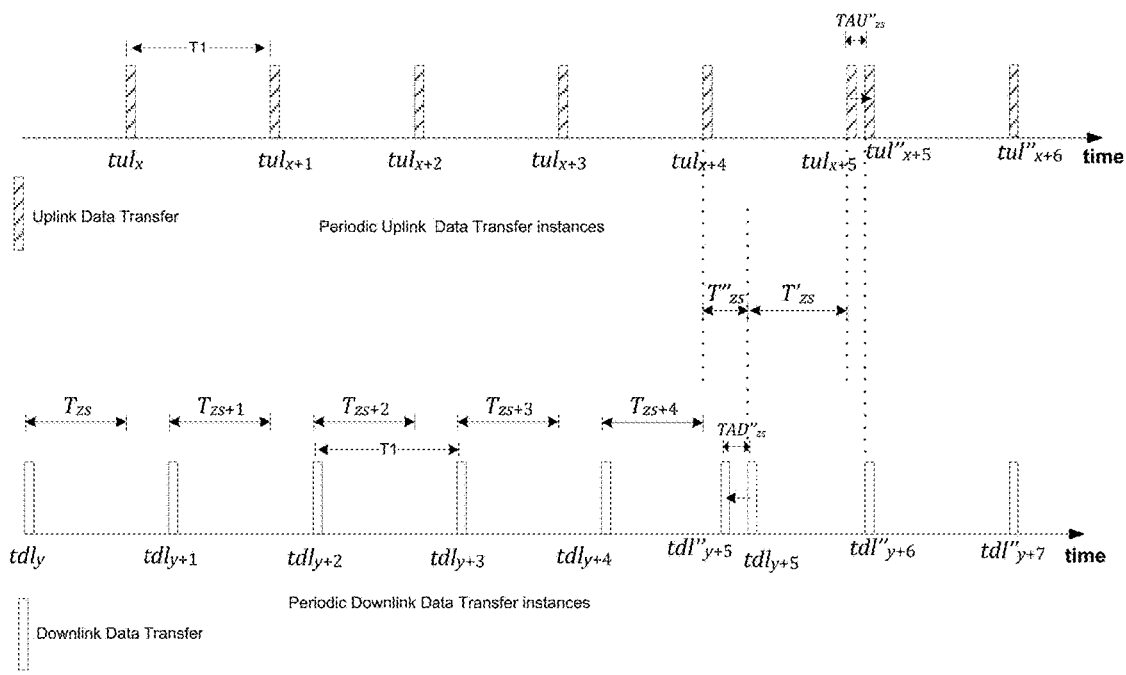
FIG. 17 illustrates the server advancing the downlink data transfer instances by $TAD''_{zs}$ and the source or destination or both applications delaying the uplink data transfer instances by $TAU''_{zs}$ in accordance with the aspects of the present disclosure to bring the downlink data transfer instances close to or overlap with the uplink data transfer instances.

According to yet another aspect of the present disclosure, for the scenario illustrated in FIG. 2A, the server may send the $T'_{zs}$, calculated using EQ. (3), and may send the $T''_{zs}$, calculated using EQ. (4), to the destination application entity. The server and the destination application entity may negotiate and may agree on the timing alignment for the downlink data transfer instances and the uplink data transfers instances such that both the downlink data transfer instances and the uplink data transfers instances may be brought close to each other or may overlap with each other. The server and the destination application entity may exchange and negotiate the timing information through the payload header or through the control messages. An example where the server may delay the downlink data transfer instances by $TAD'_{zs}$ and the destination application entity may advance the uplink data transfer instances by $TAU'_{zs}$, where $TAU'_{zs}+TAD'_{zs}=T'_{zs}$ such that the downlink data transfer instances and uplink data transfer instances may be brought close to each other or may overlap with each other is shown in FIG. 16. An example where the server advances the downlink data transfer instances by $TAD''_{zs}$ and the destination application entity delaying the uplink data transfer instances by $TAU''_{zs}$, where $TAU''_{zs}+TAD''_{zs}=T''_{zs}$ such that the downlink data transfer instances and uplink data transfer instances may overlap with each other is show in FIG. 17. Here the destination application entity may be a client or may be two clients where the application may be running in two clients and the server may be coordinating the data transfer between the two clients.

The methods and apparatus described in the present disclosure are few examples of monitoring and aligning the uplink data transfer and the downlink data transfer instances close to each other or overlap with each other. It is understood that there may be other methods to monitor and align the uplink data transfer and the downlink data transfer instances close to each other or overlap with each other so that both uplink data transfer and downlink data transfer may take place in a single active state of the client terminal.

The alignment of uplink data transfer instances and the downlink data transfer instances close to each other or overlap with each other may reduce the power consumption at the client terminal. In the best case scenario, the rate at which the client terminal enters into active state to perform uplink data transfer and downlink data transfer may be reduced to half as shown in FIG. 9. This in turn may significantly reduce the power consumption of the client terminal, which may be a significant advantage for battery operated client terminals.

In some applications the uplink data transfer and the downlink data transfer may not be periodic or the uplink data transfer period may be different than that of the downlink data transfer period. In such cases even if only some of the uplink data transfer instances and downlink data transfer instances may be aligned close to each other or overlapped with each other, it may significantly reduce the power consumption of the client terminal, which may be a significant advantage for battery operated client terminals. According to an aspect of the present disclosure, in case of non-periodic data transfer, after initially making the uplink data transfer and the downlink data transfer aligned close to each other or overlapped with each other, the Client or the Server or both may continue to monitor the uplink data transfer and the downlink data transfer instances and may periodically reevaluate whether to continue the alignment or let the uplink data transfer and the downlink data transfer instances to be independent. This decision may be based on QoS criteria such as latency and jitter. According to another aspect of the present disclosure, the decision regarding whether to continue the alignment of uplink data transfer and the downlink data transfer instances or not may be made after applying hysteresis to the various metrics used in the decision making in order to ensure stable operation and avoid switching back and forth between aligned uplink data transfer and the downlink data transfer instances and unaligned uplink data transfer and the downlink data transfer instances.

Figure 18:
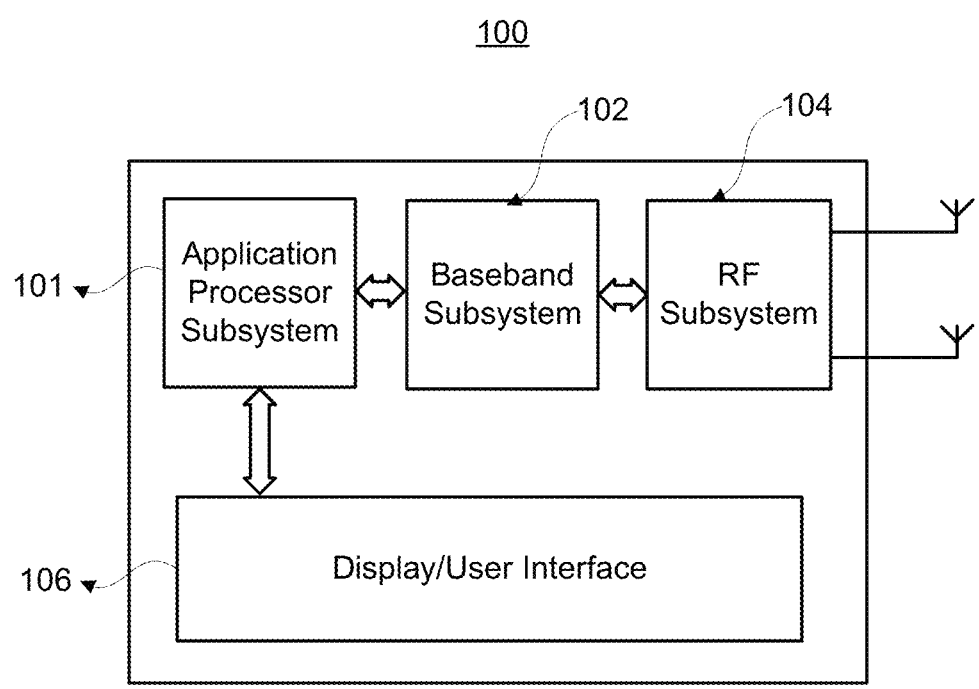
FIG. 18 illustrates a wireless mobile station diagram, which may be employed with aspects of the disclosure described herein.

By way of example only, the above-described method may be implemented in a user device such as a wireless mobile station 100 in FIG. 18.

As shown in FIG. 18, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 19:
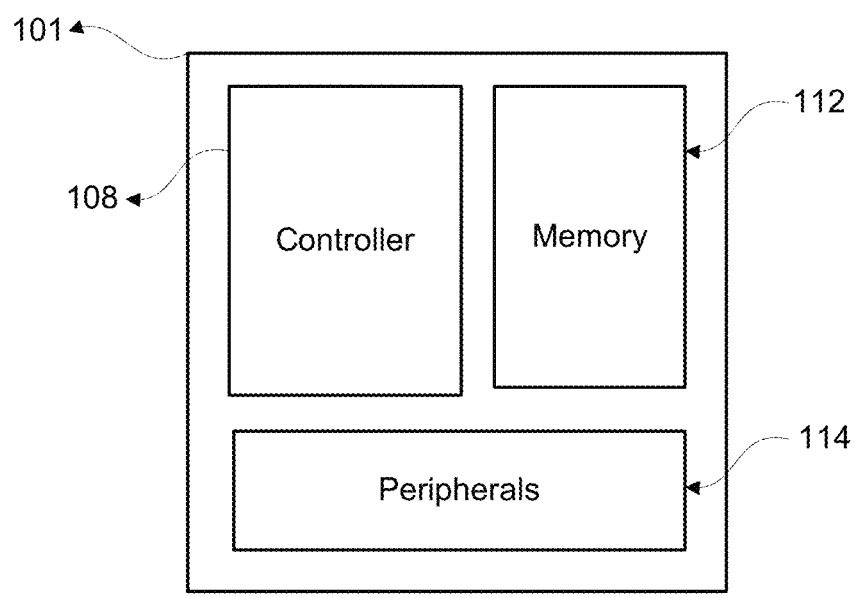
FIG. 19 illustrates an application processor subsystem for a wireless mobile station, which may be employed with aspects of the disclosure described herein.
Figure 20:
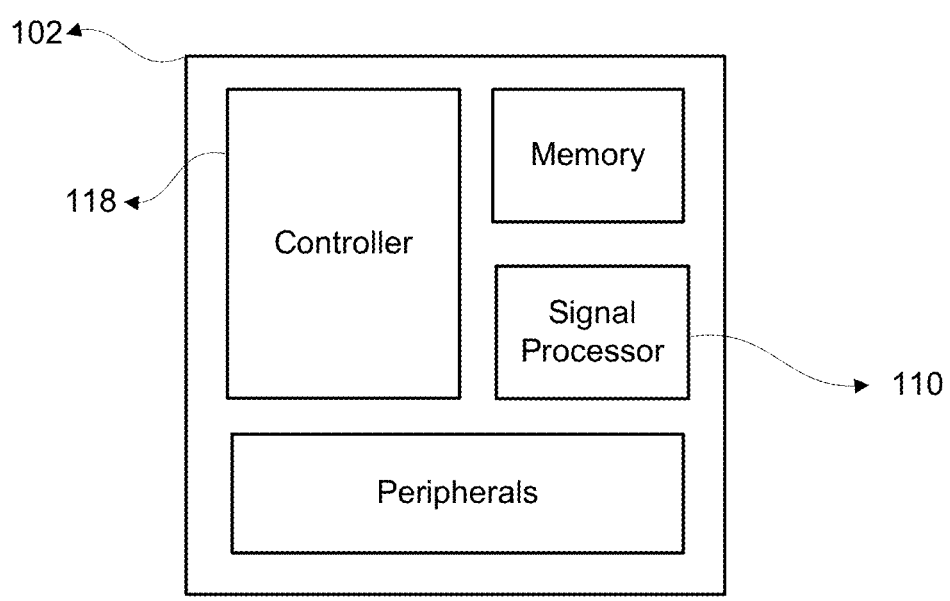
FIG. 20 illustrates a baseband subsystem for a wireless mobile station, which may be employed with aspects of the disclosure described herein.
Figure 21:
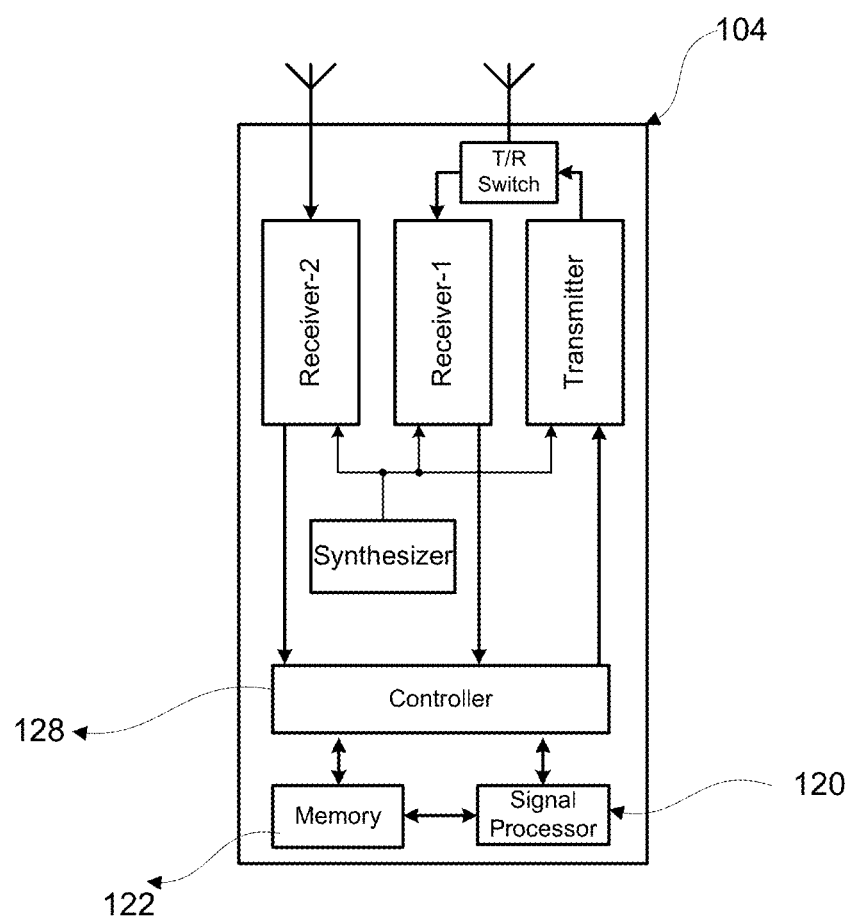
FIG. 21 illustrates a Radio Frequency (RF) subsystem for a wireless mobile station, which may be employed with aspects of the disclosure described herein.

The application processor subsystem 101 as shown in FIG. 19 may include a controller 108 such as a microcontroller, another processor or other circuitry. The baseband subsystem 102 as shown in FIG. 20 may include a controller 118 such as a microcontroller or other processor. The RF subsystem 104 as shown in FIG. 21 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

In FIG. 19, the Peripherals 114 such as a full or partial keyboard, video or still image display, audio interface, etc. may be employed and managed through the controller 108.

Aspects of the present disclosure may be implemented in firmware of the controller 108 of the application processor in FIG. 19 and/or the controller 118 of the baseband subsystem in FIG. 20. In another alternative, aspects of the present disclosure may also be implemented as a combination of firmware and hardware of the application processor subsystem 101 of FIG. 19 and/or the baseband subsystem 102 of FIG. 20. For instance, a signal processing entity of any or all of the FIG. 20 may be implemented in firmware, hardware and/or software. It may be part of the baseband subsystem, the receiver subsystem or be associated with both subsystems. In one example, the controller 118 and/or the signal processor 110 in FIG. 20 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use this disclosure may include smartphones, tablets, laptops, gaming consoles, cameras, video camcorders, TV, car entertainment systems, etc.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

In another alternative, aspects of the present disclosure may be implemented in network elements in addition to or distinct from implementation in mobile stations. For instance, one or more base stations of a wireless communication network may employ a baseband subsystem and/or an RF subsystem such as those detailed above. Software and/or firmware embodying any of the methods in accordance with aspects of the present disclosure may be executed by a controller or signal processor of the baseband subsystem. In another alternative, aspects of the present disclosure may also be implemented as a combination of firmware and hardware of the baseband subsystem.

Although the disclosure herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for bidirectional data transfer between a source application entity and a destination application entity in a wireless communication system, the method comprising:
controlling, by at least one processing device of the destination application entity as a client device in the wireless communication system:
monitoring uplink data transfer and downlink data transfer between the source application entity and the destination application entity, and
uplink data transfer instances and downlink data transfer instances to take place respectively in single active states of the client device based on the monitoring;
in which the least one processing device uses a client device application to monitor the uplink data transfer timing and the downlink data transfer timing for n uplink data transfers $tul_x, tul_{x+1}, tul_{x+2}, \ldots, tul_{x+n-1}$ and n downlink data transfers $tdl_y, tdl_{y+1}, tdl_{y+2}, \ldots, tdl_{y+n-1}$;
in which the downlink data transfer instances correspond respectively to times at which the client device is to receive downlink data from the source application entity; and
controlling, by the at least one processing device using the client device application,
determining a time difference, $T_{zc}$, between every downlink data transfer instance and uplink data transfer instance pair of the n uplink and downlink data transfer instances, wherein $T_{zc}=|tdl_y-tul_x|$, $tdl_y$ is a given downlink data transfer instance of the n downlink data transfer instances and $tul_x$ is a given uplink data transfer instance of the n uplink data transfer instances;
determining a mean time difference, $T'_{zc}$ from the time differences $T_{zc}, T_{zc+1}, T_{zc+2}, \ldots, T_{zc+n-1}$; and
when a bidirectional application with periodic downlink data transfer and periodic uplink data transfer is determined,
determining that the individual time differences $T_{zc}, T_{zc+1}, T_{zc+2}, \ldots, T_{zc+n-1}$ are approximately the same as the mean time difference $T'_{zc}$, when the individual time differences are within a predetermined threshold C of the mean time difference $T'_{zc}$,
determining a difference, $T''_{zc}$, between a time duration between two consecutive uplink data transfer instances and two consecutive downlink data transfer instances, T1, and $T'_{zc}$, where $T''_{zc}=|T1-T'_{zc}|$, and
when $T'_{zc}<T''_{zc}$, delaying an uplink data transfer instance $tul_{y+n}$ to an uplink data transfer instance at $tul'_{y+n}$, wherein $tul'_{y+n}=(tul_{y+n}+T'_{zc})$, and
when $T'_{zc} \geq T''_{zc}$ and the uplink data transfer instance at $tul_{y+n}$ is determined to be advanceable to an uplink data transfer instance at $tul''_{y+n}$, wherein $tul''_{y+n}=(tul_{y+n}-T''_{zc})$, advancing the uplink data transfer instance at $tul_{y+n}$ to the uplink data transfer instance at $tul''_{y+n}$.

2. The method of claim 1, further comprising:
controlling, by the at least one processing device, when the source application entity and the destination application entity establish a connection at a level of an application,
determining Quality of Service (QoS) requirements for the application; and
negotiating a time interval for at least one of the uplink data transfer or the downlink data transfer such that the uplink data transfer instances and the downlink data transfer instances are aligned close to or overlapping with each other.

3. The method of claim 1, wherein whether the uplink data transfer instance at $tul_{y+n}$ is determined to be delayable to the uplink data transfer instance at $tul'_{y+n}$ is based on a Quality of Service (QoS) parameter of at least one of delay, jitter or latency.

4. The method of claim 1, wherein whether the uplink data transfer instance at $tul_{y+n}$ is determined to be advanceable to the uplink data transfer instance at $tul''_{y+n}$ is based on a Quality of Service (QoS) parameter of at least one of delay, jitter or latency.

5. The method of claim 1, wherein n is determined based on at least one of simulation or field data analysis.

6. The method of claim 1, wherein n is equal to five.

7. The method of claim 1, further comprising:
controlling, by the at least one processing device, when a determination is that a payload header or a control message in control information from the source application entity contains a payload data time stamp, using the payload data time stamp to determine the time difference, $T_{zc}$.

8. The method of claim 1, further comprising:
controlling, by the at least one processing device, when at least one of (i) at least one of the downlink data transfer or the uplink data transfer is determined to be non-periodic or (ii) an uplink data transfer period is determined to be different from a downlink data transfer period,
periodically determining, based on the monitoring, whether to continue a process to align the uplink data transfer with the downlink data transfer.

9. The method of claim 8,
wherein the periodic determining whether to continue the process to align the uplink data transfer with the downlink data transfer is at least one of (i) based on Quality of Service (QoS) criteria including at least one of latency and jitter or (ii) performed after hysteresis is applied to at least one metric used in determining whether to continue the process to align.

10. A method for bidirectional data transfer between a source application entity and a destination application entity in a wireless communication system, the method comprising:
controlling, by at least one processing device of the source application entity as a client device in the wireless communication system:
monitoring uplink data transfer and downlink data transfer between the source application entity and the destination application entity, and
uplink data transfer instances and downlink data transfer instances to take place respectively in single active states of the client device, based on the monitoring;
wherein the least one processing device uses a client device application to monitor the uplink data transfer timing and the downlink data transfer timing for n uplink data transfers $tul_x, tul_{x+1}, tul_{x+2}, \ldots, tul_{x+n-1}$ and n downlink data transfers $tdl_y, tdl_{y+1}, tdl_{y+2}, \ldots, tdl_{y+n-1}$; and
controlling, by the at least one processing device,
determining a time difference, $T_{zc}$, between every downlink data transfer instance and uplink data transfer instance pair of the n uplink and downlink data transfer instances, wherein $T_{zc}=|tdl_y-tul_x|$, $tdl_y$ is a given downlink data transfer instance of the n downlink data transfer instances and $tul_x$ is a given uplink data transfer instance of the n uplink data transfer instances;
determining a mean time difference, $T'_{zc}$, from the time differences $T_{zc}, T_{zc+1}, T_{zc+2}, \ldots, T_{zc+n-1}$;
when a bidirectional application with periodic downlink data transfer and periodic uplink data transfer is determined, determining a difference, $T''_{zc}$, between a time duration between two consecutive uplink data transfer instances and two consecutive downlink data transfer instances, T1, and $T_{zc}$, where $T''_{zc}=|T1-T'_{zc}|$;

transmitting at least one of the $T'_{zc}$ or the $T''_{zc}$ to the destination application entity; and
negotiating, between the client device application and the destination application entity, timing alignment for the uplink data transfer instances and the downlink data transfer instances to be brought close to or overlap with each other,
in which the client device application and the destination application entity exchange and negotiate timing information through at least one of a payload header or control message in control information.

11. The method of claim 10,
wherein the uplink data transfer instances are delayed by the client device application by $TAU'_{zc}$ and the downlink data transfer instances are advanced by the destination application entity by $TAD'_{zc}$, where $TAU'_{zc}+TAD'_{zc}=T'_{zc}$, and
wherein the destination application entity may be another client device or a given server of the wireless communication system.

12. A method for bidirectional data transfer between a source application entity and a destination application entity in a wireless communication system, the method comprising:
controlling, by at least one processing device of another application entity as a server in the wireless communication system:
monitoring uplink data transfer and downlink data transfer between the source application entity and the destination application entity, and
uplink data transfer instances and downlink data transfer instances to take place respectively in single active states of a client device of the wireless communication system, based on the monitoring, wherein the client device is the source application entity;
wherein the least one processing device uses a server application to monitor the uplink data transfer timing and the downlink data transfer timing for n uplink data transfers $tul_x, tul_{x+1}, tul_{x+2}, \ldots, tul_{x+n-1}$ and n downlink data transfers $tdl_y, tdl_{y+1}, tdl_{y+2}, \ldots, tdl_{y+n-1}$;
in which the uplink data transfer instances correspond respectively to times at which the server is to receive uplink data from the source application entity; and
controlling, by the at least one processing device using the server application,
determining a time difference, $T_{zs}$, between every downlink data transfer and uplink data transfer instance pair of the n uplink and downlink data transfer instances, wherein $T_{zs}=|tdl_y-tul_x|$, $tdl_y$ is a given downlink data transfer instance of the n downlink data transfer instances and $tul_x$ is a given uplink data transfer instance of the n uplink data transfer instances;
determining a mean time difference, $T'_{zs}$, from the time differences $T_{zs}, T_{zs+1}, T_{zs+2}, \ldots, T_{zs+n-1}$; and
when a bidirectional application with a periodic downlink data transfer and uplink data transfer is determined,
determining that the individual time differences $T_{zs}, T_{zs+1}, T_{zs+2}, \ldots, T_{zs+n-1}$ are approximately the same as the mean time difference $T'_{zs}$, when the individual time differences are within a predetermined threshold C of the mean time difference $T'_{zs}$,
determining a difference, $T''_{zs}$, between a time duration between two consecutive uplink data transfer instances and two consecutive downlink data transfer instances, T1, and $T'_{zs}$, where $T''_{zs}=|T1-T'_{zs}|$, and when $T'_{zs}<T''_{zs}$, delaying a downlink data transfer instance at $tdl_{y+n}$ to a downlink data transfer instance at $tdl'_{y+n}$, wherein $tdl'_{y+n}=(tdl_{y+n}+T'_{zs})$, and when $T'_{zs} \geq T''_{zs}$ and the downlink data transfer instance at $tdl_{y+n}$ is determined to be advanceable to a downlink data transfer instance at $tdl''_{y+n}$, wherein $tdl''_{y+n}=(tdl_{y+n}-T''_z)$, advancing the downlink data transfer instance at $tdl_{y+n}$ to the downlink data transfer instance at $tdl''_{y+n}$.

13. The method of claim 12, wherein whether the downlink data transfer instance at $tdl_{y+n}$ is determined to be delayable to the downlink data transfer instance at $tdl'_{y+n}$ is based on a Quality of Service (QoS) parameter of at least one of delay, jitter or latency.

14. The method of claim 12, wherein whether the downlink data transfer instance at $tdl_{y+n}$ is determined to be advanceable to the downlink data transfer instance at $tdl''_{y+n}$ is based on a Quality of Service (QoS) parameter of at least one of delay, jitter or latency.

15. The method of claim 12, wherein, when a determination is that a payload header or a control message in control information from the source application entity contains payload data time stamp, the payload data time stamp from the source application entity is used to determine the time difference, $T_{zs}$.

16. A method for bidirectional data transfer between a source application entity and a destination application entity in a wireless communication system, the method comprising:

controlling, by at least one processing device of another application entity as a server in the wireless communication system:

monitoring uplink data transfer and downlink data transfer between the source application entity and the destination application entity, and uplink data transfer instances and downlink data transfer instances to take place respectively in single active states of a client device, based on the monitoring, wherein the client device is the destination application entity;

wherein the least one processing device uses an application to monitor the uplink data transfer timing and the downlink data transfer timing for n uplink data transfers $tul_x, tul_{x+1}, tul_{x+2}, \ldots, tul_{x+n-1}$ and n downlink data transfers $tdl_y, tdl_{y+1}, tdl_{y+2}, \ldots, tdl_{y+n-1}$; and controlling, by the at least one processing device, using the application, determining a time difference, $T_{zs}$, between every downlink data transfer and uplink data transfer instance pair of the n uplink and downlink data transfer instances, wherein $T_{zs}=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_{zs}$, from the time differences $T_{zs}, T_{zs+1}, T_{zs+2}, \ldots, T_{zs+n-1}$;

when a bidirectional application with a periodic downlink data transfer and uplink data transfer is determined, determining a difference, $T''_{zs}$, between a time duration between two consecutive uplink data transfer instances and two consecutive downlink data transfer instances, T1, and $T'_{zs}$, where $T''_{zs}=|T1-T'_{zs}|$, and transmitting, by the server, at least one of the $T'_{zs}$ or the $T''_{zs}$ to the destination application entity; and negotiating, between the server and the destination application entity, timing alignment for the uplink data transfer instances and the downlink data transfer instances to be brought close to or overlap with each other, in which the server and the destination application entity exchange and negotiate the timing information through at least one of a payload header or a control message in control information.

17. The method of claim 16, wherein the downlink data transfer instances are delayed by the server by $TAD'_{zs}$ and the uplink data transfer instances are advanced by the destination application entity by $TAU'_{zs}$, where $TAU'_{zs}+TAD'_{zs}=T'_{zs}$ such that the downlink data transfer instances and uplink data transfer instances are brought close to each other or overlap with each other, and wherein the application is being executed in two given clients as the destination application entity, and the server is coordinating the data transfer between the two given clients.

18. An apparatus for bidirectional data transfer between a source application entity and a destination application entity in a wireless communication system, the apparatus comprising:

circuitry the destination application entity as a client device in the wireless communication system, configured to control:

monitoring uplink data transfer and downlink data transfer between the source application entity and the destination application entity, and uplink data transfer instances and downlink data transfer instances to take place respectively in single active states of the client device, based on the monitoring;

in which the circuitry is configured to use a client device application to monitor the uplink data transfer timing and the downlink data transfer timing for n uplink data transfers $tul_x, tul_{x+1}, tul_{x+2}, \ldots, tul_{x+n-1}$ and n downlink data transfers $tdl_y, tdl_{y+1}, tdl_{y+2}, \ldots, tdl_{y+n-1}$;

in which the downlink data transfer instances correspond respectively to times at which the client device is to receive downlink data from the source application entity; and in which the circuitry is configured to control, using the client device application, determining a time difference, $T_{zc}$, between every downlink data transfer instance and uplink data transfer instance pair of the n uplink and downlink data transfer instances, wherein $T_{zc}=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_{zc}$ from the time differences $T_{zc}, T_{zc+1}, T_{zc+2}, \ldots, T_{zc+n-1}$; and when a bidirectional application with periodic downlink data transfer and periodic uplink data transfer is determined, determining that the individual time differences $T_{zc}, T_{zc+1}, T_{zc+2}, \ldots, T_{zc+n-1}$ are approximately the same as the mean time difference $T'_{zc}$, when the individual time differences are within a predetermined threshold C of the mean time difference $T'_{zc}$, determining a difference, $T''_{zc}$, between a time duration between two consecutive uplink data transfer instances and two consecutive downlink data transfer instances, T1, and $T'_{zc}$, where $T''_{zc}=|T1-T'_{zc}|$, and when $T'_{zc}<T''_{zc}$, delaying an uplink data transfer instance $tul_{y+n}$, to an uplink data transfer instance at $tul'_{y+n}$, wherein $tul'_{y+n}=(tul_{y+n}+T'_{zc})$, and when $T'_{zc} \geq T''_{zc}$ and the uplink data transfer instance at $tul_{y+n}$ is determined to be advanceable to an uplink data transfer instance at $tul''_{y+n}$, wherein $tul''_{y+n}=(tul_{y+n}-T''_{zc})$, advancing the uplink data transfer instance at $tul_{y+n}$ to the uplink data transfer instance at $tul''_{y+n}$.

19. A wireless communication device comprising:

a receiver to receive a wireless communication; and a processing device configured for bidirectional data transfer between a source application entity and a destination application entity in a wireless communication system, wherein the wireless communication device is the destination application entity as a client device in the wireless communication system, and wherein the processing device is configured to control:
monitoring uplink data transfer and downlink data transfer between the source application entity and the destination application entity, and uplink data transfer instances and downlink data transfer instances to take place respectively in single active states of the client device based on monitoring;

in which the processing device is configured to use a client device application to monitor the uplink data transfer timing and the downlink data transfer timing for n uplink data transfers $tul_x$, $tul_{x+1}$, $tul_{x+2}$, . . . , $tul_{x+n-1}$ and n downlink data transfers $tdl_y$, $tdl_{y+1}$, $tdl_{+2}$, . . . , $tdl_{y+n-1}$;

in which the downlink data transfer instances correspond respectively to times at which the client device is to receive downlink data from the source application entity; and in which the processing device is configured to control, using the client device application, determining a time difference, $T_{zc}$, between every downlink data transfer instance and uplink data transfer instance pair of the n uplink and downlink data transfer instances, wherein $T_{zc}=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_{zc}$, from the time differences $T_{zc}$, $T_{zc+1}$, $T_{zc+2}$, . . . , $T_{zc+n-1}$; and when a bidirectional application with periodic downlink data transfer and periodic uplink data transfer is determined, determining that the individual time differences $T_{zc}$, $T_{zc+1}$, $T_{zc+2}$, . . . , $T_{zc+n-1}$ are approximately the same as the mean time difference $T'_{zc}$, when the individual time differences are within a predetermined threshold C of the mean time difference $T'_{zc}$, determining a difference, $T''_{zc}$, between a time duration between two consecutive uplink data transfer instances and two consecutive downlink data transfer instances, T1, and $T'_{zc}$, where $T''_{zc}=|T1-T'_{zc}|$, and when $T'_{zc}<T''_{zc}$ delaying an uplink data transfer instance at $tul_{y+n}$ to an uplink data transfer instance at $tul'_{y+n}$, wherein $tul'_{y+n}=(tul_{y+n}+T'_{zc})$, and when $T'_{zc} \geq T''_{zc}$ and the uplink data transfer instance at $tul''_{y+n}$ is determined to be advanceable to an uplink data transfer instance at $tul''_{y+n}$ wherein $tul''_{y+n}=(tul_{y+n}-T''_{zc})$, advancing the uplink data transfer instance at $tul_{y+n}$ to the uplink data transfer instance at $tul''_{y+n}$.

20. An apparatus for bidirectional data transfer between a source application entity and a destination application entity in a wireless communication system, the apparatus comprising:

circuitry of the source application entity as a client device in the wireless communication system, configured to control:
monitoring uplink data transfer and downlink data transfer between the source application entity and the destination application entity, and uplink data transfer instances and downlink data transfer instances to take place respectively in single active states of the client device, based on the monitoring;

wherein the circuitry is configured to use a client device application to monitor the uplink data transfer timing and the downlink data transfer timing for n uplink data transfers $tul_x$, $tul_{x+1}$, $tul_{x+2}$, . . . , $tul_{x+n-1}$ and n downlink data transfers $tdl_y$, $tdl_{y+1}$, $tdl_{y+2}$, . . . , $tdl_{y+n-1}$; and in which the circuitry is configured to control:
determining a time difference, $T_{zc}$, between every downlink data transfer instance and uplink data transfer instance pair of the n uplink and downlink data transfer instances, wherein $T_{zc}=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_{zc}$, from the time differences $T_{zc}$, $T_{zc+1}$, $T_{zc+2}$, . . . , $T_{zc+n-1}$;

when a bidirectional application with periodic downlink data transfer and periodic uplink data transfer is determined, determining a difference, $T''_{zc}$, between a time duration between two consecutive uplink data transfer instances and two consecutive downlink data transfer instances, T1, and $T'_{zc}$, where $T''_{zc}=|T1-T'_{zc}|$;

transmitting at least one of the $T'_{zc}$ or the $T''_{zc}$ to the destination application entity; and negotiating, between the client device application and the destination application entity, timing alignment for the uplink data transfer instances and the downlink data transfer instances to be brought close to or overlap with each other, in which the client device application and the destination application entity exchange and negotiate timing information through at least one of a payload header or control message in control information.

21. A wireless communication device comprising:
a receiver to receive a wireless communication; and a processing device configured for bidirectional data transfer between a source application entity and a destination application entity in a wireless communication system, wherein the wireless communication device is of the source application entity as a client device in the wireless communication system, and wherein the processing device is configured to control:
monitoring uplink data transfer and downlink data transfer between the source application entity and the destination application entity, and
uplink data transfer instances and downlink data transfer instances to take place respectively in single active states of the client device, based on the monitoring;

wherein the processing device is configured to use a client device application to monitor the uplink data transfer timing and the downlink data transfer timing for n uplink data transfers $tul_x$, $tul_{x+1}$, $tul_{x+2}$, ..., $tul_{x+n-1}$ and n downlink data transfers $tdl_y$, $tdl_{y+1}$, $tdl_{y+2}$, ..., $tdl_{y+n-1}$; and wherein the processing device is configured to control:
determining a time difference, $T_{zc}$, between every downlink data transfer instance and uplink data transfer instance pair of the n uplink and downlink data transfer instances, wherein $T_{zc}=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_{zc}$, from the time differences $T_{zc}$, $T_{zc+1}$, $T_{zc+2}$, ..., $T_{zc+n-1}$;

when a bidirectional application with periodic downlink data transfer and periodic uplink data transfer is determined, determining a difference, $T''_{zc}$, between a time duration between two consecutive uplink data transfer instances and two consecutive downlink data transfer instances, T1, and $T'_{zc}$, where $T''_{zc}=|T1-T'_{zc}|$;

transmitting at least one of the $T'_{zc}$ or the $T''_{zc}$ to the destination application entity; and negotiating, between the client device application and the destination application entity, timing alignment for the uplink data transfer instances and the downlink data transfer instances to be brought close to or overlap with each other, in which the client device application and the destination application entity exchange and negotiate timing information through at least one of a payload header or control message in control information.

22. An apparatus for bidirectional data transfer between a source application entity and a destination application entity in a wireless communication system, the apparatus comprising:

circuitry of another application entity as a server in the wireless communication system, configured to control:
monitoring uplink data transfer and downlink data transfer between the source application entity and the destination application entity, and
uplink data transfer instances and downlink data transfer instances to take place respectively in single active states of a client device of the wireless communication system, based on the monitoring, wherein the client device is the source application entity;

wherein the circuitry is configured to use a server application to monitor the uplink data transfer timing and the downlink data transfer timing for n uplink data transfers $tul_x$, $tul_{x+1}$, $tul_{x+2}$, ..., $tul_{x+n-1}$ and n downlink data transfers $tdl_y$, $tdl_{y+1}$, $tdl_{y+2}$, ..., $tdl_{y+n-1}$;

in which the uplink data transfer instances correspond respectively to times at which the server is to receive uplink data from the source application entity; and wherein the circuitry is configured to control, using the server application,
determining a time difference, $T_{zs}$, between every downlink data transfer and uplink data transfer instance pair of the n uplink and downlink data transfer instances, wherein $T_{zs}=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_{zs}$, from the time differences $T_{zs}$, $T_{zs+1}$, $T_{zs+2}$, ..., $T_{zs+n-1}$; and when a bidirectional application with a periodic downlink data transfer and uplink data transfer is determined,
determining that the individual time differences $T_{zs}$, $T_{zs+1}$, $T_{zs+2}$, ..., $T_{zs+n-1}$ are approximately the same as the mean time difference $T'_{zs}$, when the individual time differences are within a predetermined threshold C of the mean time difference $T'_{zs}$, determining a difference, $T''_{zs}$, between a time duration between two consecutive uplink data transfer instances and two consecutive downlink data transfer instances, T1, and where $T'_{zs}=|T1-T'_{zs}|$, and when $T'_{zs}<T''_{zs}$, delaying a downlink data transfer instance at $tdl_{y+n}$, to a downlink data transfer instance at $tdl'_{y+n}$, wherein $tdl'_{y+n}=(tdl_{y+n}+T'_{zs})$, and when $T'_{zs} \geq T''_{zs}$ and the downlink data transfer instance at $tdl_{y+n}$ is determined to be advanceable to a downlink data transfer instance at $tdl''_{y+n}$, wherein $tdl''_{y+n}=(tdl_{y+n}-T'_z)$, advancing the downlink data transfer instance at $tdl_{y+n}$ to the downlink data transfer instance at $tdl''_{y+n}$.

23. A wireless communication device comprising:
a receiver to receive a wireless communication; and
a processing device configured for bidirectional data transfer between a source application entity and a destination application entity in a wireless communication system, wherein the wireless communication device is of another application entity as server in the wireless communication system, and wherein the processing device is configured to control:
monitoring uplink data transfer and downlink data transfer between the source application entity and the destination application entity, and
uplink data transfer instances and downlink data transfer instances to take place respectively in single active states of a client device of the wireless communication system, based on the monitoring, wherein the client device is the source application entity;

wherein the processing device is configured to use a server application to monitor the uplink data transfer timing and the downlink data transfer timing for n uplink data transfers $tul_x$, $tul_{x+1}$, $tul_{x+2}$, ..., $tul_{x+n-1}$ and n downlink data transfers $tdl_y$, $tdl_{y+1}$, $tdl_{y+2}$, ..., $tdl_{y+n-1}$;

in which the uplink data transfer instances correspond respectively to times at which the server is to receive uplink data from the source application entity; and wherein the processing device is configured to control, using the server application, determining a time difference, $T_{zs}$, between every downlink data transfer and uplink data transfer instance pair of the n uplink and downlink data transfer instances, wherein $T_{zs}=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_{zs}$, from the time differences $T_{zs}, T_{zs+1}, T_{zs+2}, \ldots, T_{zs+n-1}$; and when a bidirectional application with a periodic downlink data transfer and uplink data transfer is determined, determining that the individual time differences $T_{zs}$, $T_{zs+1}, T_{zs+2}, \ldots, T_{zs+n-1}$ are approximately the same as the mean time difference $T'_{zs}$, when the individual time differences are within a predetermined threshold C of the mean time difference $T'_{zs}$, determining a difference, $T''_{zs}$, between a time duration between two consecutive uplink data transfer instances and two consecutive downlink data transfer instances, T1, and $T'_{zs}$, where $T''_{zs}=|T1-T'_{zs}|$, and when $T'_{zs}<T''_{zs}$, delaying a downlink data transfer instance at $tdl_{y+n}$ to a downlink data transfer instance at $tdl'_{y+n}$, wherein $tdl'_{y+n}=(tdl_{y+n}+T'_{zs})$, and when $T'_{zs} \geq T''_{zs}$ and the downlink data transfer instance at $tdl_{y+n}$ is determined to be advanceable to a downlink data transfer instance at $tdl''_{y+n}$, wherein $tdl''_{y+n}=(tdl_{y+n}-T''_z)$, advancing the downlink data transfer instance at $tdl_{y+n}$ to the downlink data transfer instance at $tdl''_{y+n}$.

24. An apparatus for bidirectional data transfer between a source application entity and a destination application entity in a wireless communication system, the apparatus comprising:

circuitry of another application entity as a server in the wireless communication system, configured to control:
monitoring uplink data transfer and downlink data transfer between the source application entity and the destination application entity, and
uplink data transfer instances and downlink data transfer instances to take place respectively in single active states of a client device, based on the monitoring, wherein the client device is the destination application entity;

wherein the circuitry is configured to use an application to monitor the uplink data transfer timing and the downlink data transfer timing for n uplink data transfers $tul_x$, $tul_{x+1}, tul_{x+2}, \ldots, tul_{x+n-1}$ and n downlink data transfers $tdl_y, tdl_{y+1}, tdl_{y+2}, \ldots, tdl_{y+n-1}$; and wherein the circuitry is configured to control, using the application, determining a time difference, $T_{zs}$, between every downlink data transfer and uplink data transfer instance pair of the n uplink and downlink data transfer instances, wherein $T_{zs}=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_{zs}$, from the time differences $T_{zs}, T_{zs+1}, T_{zs+2}, \ldots, T_{zs+n-1}$;

when a bidirectional application with a periodic downlink data transfer and uplink data transfer is determined, determining a difference, $T''_{zs}$, between a time duration between two consecutive uplink data transfer instances and two consecutive downlink data transfer instances, T1, and $T'_{zs}$, where $T''_{zs}=|T1-T'_{zs}|$, and transmitting, by the server, at least one of the $T'_{zs}$ or the $T''_{zs}$ to the destination application entity; and negotiating, between the server and the destination application entity, timing alignment for the uplink data transfer instances and the downlink data transfer instances to be brought close to or overlap with each other, in which the server and the destination application entity exchange and negotiate the timing information through at least one of a payload header or a control message in control information.

25. A wireless communication device comprising:
a receiver to receive a wireless communication; and
a processing device configured for bidirectional data transfer between a source application entity and a destination application entity in a wireless communication system, wherein the wireless communication device is of another application entity as a server in the wireless communication system, and wherein the processing device is configured to control:
monitoring uplink data transfer and downlink data transfer between the source application entity and the destination application entity, and
uplink data transfer instances and downlink data transfer instances to take place respectively in single active states of a client device, based on the monitoring, wherein the client device is the destination application entity;

wherein the processing device is configured to use an application to monitor the uplink data transfer timing and the downlink data transfer timing for n uplink data transfers $tul_x, tul_{x+1}, tul_{x+2}, \ldots, tul_{x+n-1}$ and n downlink data transfers $tdl_y, tdl_{y+1}, tdl_{y+2}, \ldots, tdl_{y+n-1}$; and wherein the processing device is configured to control, using the application, determining a time difference, $T_{zs}$, between every downlink data transfer and uplink data transfer instance pair of the n uplink and downlink data transfer instances, wherein $T_{zs}=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_{zs}$, from the time differences $T_{zs}, T_{zs+1}, T_{zs+2}, \ldots, T_{zs+n-1}$;

when a bidirectional application with a periodic downlink data transfer and uplink data transfer is determined, determining a difference, $T''_{zs}$, between a time duration between two consecutive uplink data transfer instances and two consecutive downlink data transfer instances, T1, and $T'_{zs}$, where $T''_{zs}=|T1-T'_{zs}|$, and transmitting, by the server, at least one of the $T'_{zs}$ or the $T''_{zs}$ to the destination application entity; and negotiating, between the server and the destination application entity, timing alignment for the uplink data transfer instances and the downlink data transfer instances to be brought close to or overlap with each other, in which the server and the destination application entity exchange and negotiate the timing information through at least one of a payload header or a control message in control information.

* * * * *